United States Patent
Beall et al.

[11] Patent Number: 5,952,095
[45] Date of Patent: *Sep. 14, 1999

[54] INTERCALATES AND EXFOLIATES FORMED WITH LONG CHAIN ($C_{10}+$) MONOMERIC ORGANIC INTERCALANT COMPOUNDS; AND COMPOSITE MATERIALS CONTAINING SAME

[75] Inventors: Gary W. Beall, McHenry; Fernando Serrano, Chicago; Semeon Tsipursky, Lincolnwood; Steven J. Engman, Skokie, all of Ill.

[73] Assignee: AMCOL International Corporation, Arlington Heights, Ill.

[ * ] Notice: This patent is subject to a terminal disclaimer.

[21] Appl. No.: 08/758,740

[22] Filed: Dec. 6, 1996

[51] Int. Cl.⁶ .................................................. B32B 7/00
[52] U.S. Cl. .................. 428/332; 106/632; 252/378 R
[58] Field of Search .................... 428/332; 252/378 R; 106/632

[56] References Cited

U.S. PATENT DOCUMENTS

| | | | |
|---|---|---|---|
| 2,035,546 | 3/1936 | Hamilton | 167/24 |
| 3,419,460 | 12/1968 | Ure | 161/162 |
| 3,419,517 | 12/1968 | Hedrick et al. | 260/37 |

(List continued on next page.)

FOREIGN PATENT DOCUMENTS

| | | |
|---|---|---|
| 0 205 281 A3 | 12/1986 | European Pat. Off. |
| 0 335 653 A1 | 10/1989 | European Pat. Off. |
| 0 358 415 A1 | 3/1990 | European Pat. Off. |
| 0 479 031 A1 | 4/1992 | European Pat. Off. |
| 0 548 940 A1 | 6/1993 | European Pat. Off. |
| 0 645 181 A2 | 3/1995 | European Pat. Off. |
| 0 761 739 A1 | 3/1997 | European Pat. Off. |
| 1 642 122 | 7/1970 | Germany . |
| 1146668 | 3/1969 | United Kingdom . |
| 1 565 362 | 4/1980 | United Kingdom . |
| WO 93/04117 | 3/1993 | WIPO . |
| WO 93/04118 | 3/1993 | WIPO . |
| 11190 | 6/1993 | WIPO . |

OTHER PUBLICATIONS

T. Lan et al., Polym. Mater. Sci. Eng., vol. 73, 296–297 (1995).

Bujdak, et al., "The reaction of montmorillonite with octadecylamine in solid and melted state", Chemical Abstracts, vol. 118, No. 26, Abstract No. 257609b, p. 166 (Jun. 28, 1993), Columbus, Ohio (US).

C. W. Francis, "Adsorption of Polyvinylpyrrolidone on Reference Clay Minerals", Soil Science, vol. 115, No. 1, 1973, pp. 40–54.

A. Usuki, et al., "Synthesis of nylon 6–clay hybrid", J. Mater. Res., vol. 8, No. 5, May 1993, pp. 1179–1184.

(List continued on next page.)

Primary Examiner—Mary E. Ceperley
Attorney, Agent, or Firm—Marshall, O'Toole, Gerstein, Murray & Borun

[57] ABSTRACT

Intercalates formed by contacting a layered material, e.g., a phyllosilicate, with an intercalant monomer including an alkyl radical having at least 10 carbon atoms and having a dipole moment greater than the dipole moment of water, to sorb or intercalate the intercalant monomer between adjacent platelets of the layered material. Sufficient intercalant monomer is sorbed between adjacent platelets to expand the adjacent platelets to a spacing of at least about 5 Å (as measured after water removal to a maximum of 5% by weight water), up to about 100 Å and preferably in the range of about 10–45 Å, so that the intercalate easily can be exfoliated into individual platelets. The intercalated complex can be combined with an organic liquid into a viscous carrier material, for delivery of the carrier material, or for delivery of an active compound; or the intercalated complex can be combined with a matrix polymer to form a strong, filled polymer matrix.

66 Claims, 11 Drawing Sheets

U.S. PATENT DOCUMENTS

| | | | |
|---|---|---|---|
| 3,515,626 | 6/1970 | Duffield | 161/162 |
| 3,773,708 | 11/1973 | Takahashi et al. | 260/41 R |
| 3,795,650 | 3/1974 | Burns | 260/33.4 R |
| 3,912,532 | 10/1975 | Simone | 106/308 N |
| 3,929,678 | 12/1975 | Laughlin et al. | 252/526 |
| 4,125,411 | 11/1978 | Lyons | 106/291 |
| 4,210,572 | 7/1980 | Herman et al. | 260/404 |
| 4,251,576 | 2/1981 | Osborn et al. | 428/331 |
| 4,400,485 | 8/1983 | Mukamal et al. | 524/444 |
| 4,431,755 | 2/1984 | Weber et al. | 523/203 |
| 4,434,075 | 2/1984 | Mardis et al. | 252/315.2 |
| 4,472,538 | 9/1984 | Kamigaito et al. | 523/202 |
| 4,500,670 | 2/1985 | McKinley et al. | 524/445 |
| 4,546,145 | 10/1985 | Kishida et al. | 524/780 |
| 4,600,744 | 7/1986 | Libor et al. | 524/446 |
| 4,613,542 | 9/1986 | Alexander | 428/290 |
| 4,624,982 | 11/1986 | Alexander | 524/446 |
| 4,739,007 | 4/1988 | Okada et al. | 524/789 |
| 4,789,403 | 12/1988 | Rice | 106/417 |
| 4,798,766 | 1/1989 | Rice | 428/404 |
| 4,810,734 | 3/1989 | Kawasumi et al. | 523/216 |
| 4,842,651 | 6/1989 | Ravet et al. | 106/487 |
| 4,849,006 | 7/1989 | Knudson, Jr. | 71/64.11 |
| 4,875,762 | 10/1989 | Kato et al. | 350/357 |
| 4,889,885 | 12/1989 | Usuki et al. | 524/443 |
| 4,894,411 | 1/1990 | Okada et al. | 524/710 |
| 4,920,171 | 4/1990 | Hutton, Jr. et al. | 524/446 |
| 5,032,546 | 7/1991 | Giannelis et al. | 501/3 |
| 5,032,547 | 7/1991 | Giannelis et al. | 501/3 |
| 5,091,462 | 2/1992 | Fukui et al. | 524/504 |
| 5,102,948 | 4/1992 | Deguchi et al. | 524/789 |
| 5,164,440 | 11/1992 | Deguchi et al. | 524/444 |
| 5,164,460 | 11/1992 | Yano et al. | 624/445 |
| 5,204,078 | 4/1993 | Tateyama et al. | 423/331 |
| 5,206,284 | 4/1993 | Fukui et al. | 524/504 |
| 5,229,451 | 7/1993 | Carter et al. | 524/493 |
| 5,248,720 | 9/1993 | Deguchi et al. | 524/444 |
| 5,326,500 | 7/1994 | Friedman et al. | 252/378 |
| 5,340,558 | 8/1994 | Friedman et al. | 423/328.1 |
| 5,385,776 | 1/1995 | Maxfield et al. | 428/297 |
| 5,391,437 | 2/1995 | Miyasaka et al. | 528/425.5 |
| 5,414,042 | 5/1995 | Yasue et al. | 524/789 |
| 5,428,094 | 6/1995 | Tokoh et al. | 524/379 |
| 5,506,046 | 4/1996 | Andersen et al. | 524/446 |
| 5,508,072 | 4/1996 | Andersen et al. | 524/446 |
| 5,514,734 | 5/1996 | Maxfield et al. | 523/204 |
| 5,554,670 | 9/1996 | Giannelis et al. | 523/209 |
| 5,667,886 | 9/1997 | Gough et al. | 428/331 |
| 5,760,106 | 6/1998 | Pinnavaia et al. | 523/209 |

OTHER PUBLICATIONS

Y. Kojima, et al., "Mechanical Properties Of Nylon 6–Clay Hybrid", J. Mater. Res., vol. 8, No. 5, May 1993, pp. 1185–1189.

K. Suzuki, et al., "Preparation Of Delaminated Clay Having A Narrow Micropore Distribution In The Presence Of Hydroxyaluminum Cations And Polyvinyl Alcohol", Clays and Clay Minerals, vol. 36, No. 2, 1988, pp. 147–152.

R. Levy, et al., "Interlayer Adsorption of Polyvinylpyrrolidone On Montmorillonite", Journal of Colloid and Interface Science, vol. 50, No. 3, Mar. 1975, pp. 442–450.

D.J. Greenland, "Adsorption Of Polyvinyl Alcohols By Montmorillonite", Journal of Colloid Science, 18, (1963) pp. 647–664.

R.A. Vaia, et al., "Synthesis and Properties of Two–Dimensional Nanostructures by Direct Intercalation of Polymer Melts in Layered Silicates", Chem. Mater. 1993, 5, pp. 1694–1696.

R.A. Vaia, et al., "New Polymer Electrolyte Nanocomposites: Melt Intercalation of Poly(ethylene oxide) in Mica–Type Silicates", Advanced Materials 1995, 7, No. 2, pp. 154–156.

A. Akelah, et al., "Synthesis and Characterization of Epoxyphilic montmorillonites", Clay Minerals (1994) 29, pp. 169–178.

C.E. Clapp, et al., "Adsorption Studies Of A Dextran On Montmorillonite", Trans. 9th Int. Cong. Soil Sci., 1968, vol. 1, pp. 627–634.

H.G.G. Dekking, "Preparation And Properties Of Some Polymer–Clay Compounds", Clays and Clay Minerals, 1964, 12, pp. 603–616.

A. Usuki, et al., "Characterization and Properties of Nylon 6—Clay Hybrid", (source and date unknown), pp. 651–652.

G.W. Brindley, et al., "Preparation And Solvatio Properties Of Some Variable Charge Montmorillonites", Clays and Clay Minerals, 1971, vol. 18, pp. 399–404.

A. Okada, et al., "A Solid State NMR Study On Crystalline Forms Of Nylon 6", Journal of Applied Polymer Science, (1989), vol. 37, pp. 1363–1371.

A. Usuki, et al., Swelling Behavior Of Montmorillonite Cation Exchanged For $\omega$–Amino Acids By $\in$–Caprolactam, J. Mater. Res., vol. 8, No. 5, May 1993, pp. 1174–1178.

Y. Kojima, et al., "One–Pot Synthesis Of Nylon 6–Clay Hybrid", Journal of Polymer Science: Part A: Polymer Chemistry, vol. 31, (1993), pp. 1755–1758.

Y. Kojima, et al., "Fine Structure Of Nylon–6–Clay Hybrid", Journal of Polymer Science: Part B: Polymer Physics, vol. 32 (1994), pp. 625–630.

B.K.G. Theng, "Clay–Polymer interactions: Sumary And Perspectives", Clays and Clay Minerals, vol. 30, No. 1 (1982) pp. 1–9.

Sugahara, et al., "Clay–Organic Nano–Composite; Preparation of a Kaolinite–Poly(vinylpyrrolidone) Intercalation Compound", *Journal of the Ceramic Society of Japan*, International Edition, vol. 100, No. 4, Apr. 1, 1992, pp. 420–423.

Ogawa, et al., "Preparation Of Montmorillonite–Polyacrylamide Intercalation Compounds And The Water Absorbing Property", *Clay Science*, vol. 7, 1989 Tokyo, Japan, pp. 243–251.

Wu, et al., "Structural, thermal, and electrical characterization of layered nanocomposites derived from sodium–montmorillonite and polyethers", Chemical Abstracts, vol. 119, No. 4, Jul. 26, 1993 Columbus, Ohio, US, Abstract No. 31017r.

Yano, et al., "Synthesis And Properties Of Polyimide–Clay Hybrid", Polymer Preprints, ACS, Apr. 1991, pp. 65–66.

Giannelis, et al., "Synthesis And Processing Of Ceramics: Scientific Issues", Materials Research Society Symposium Proceedings, vol. 249 (1992), pp. 547–558.

Sanchez Camazano, M. et al., "Factors influencing interactions of organophosphorus pesticides with montmorillonite", Chemical Abstracts, vol. 98, No. 19, May 9, 1983, Columbus, Ohio, US, Abstract No. 156367.

FIG. 1  ⊖Na ⊖Mg ○Al ○X○ ●Si
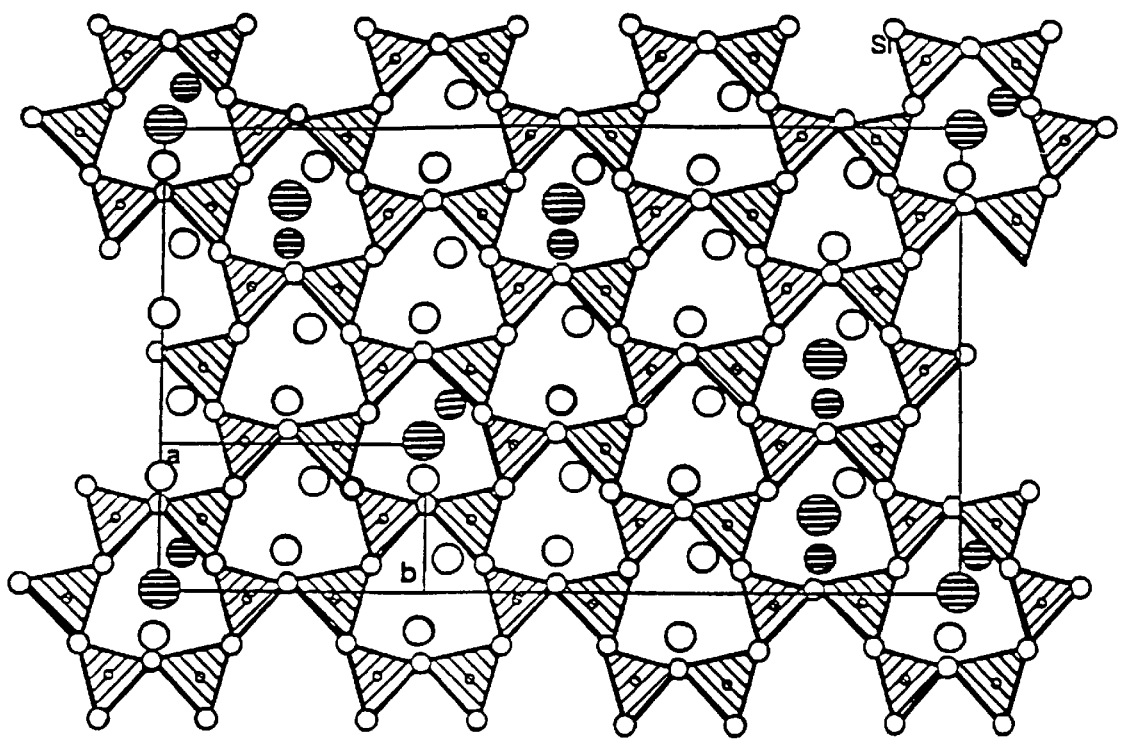
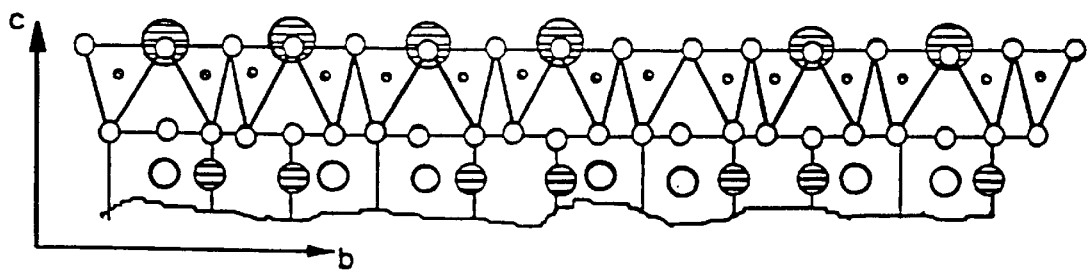
FIG. 2
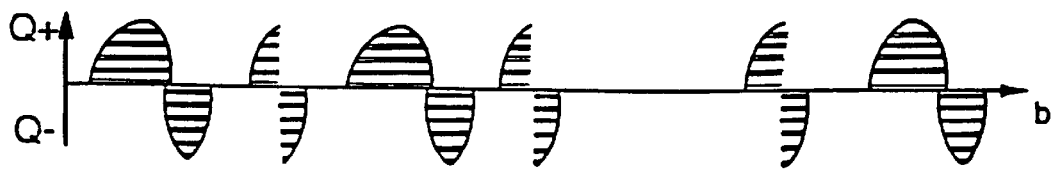
FIG. 3

INTERCALATES AND EXFOLIATES FORMED WITH LONG CHAIN ($C_{10}+$) MONOMERIC ORGANIC INTERCALANT COMPOUNDS; AND COMPOSITE MATERIALS CONTAINING SAME

FIELD OF THE INVENTION

The present invention is directed to intercalated layered materials, and exfoliates thereof, manufactured by sorption (adsorption and/or absorption) of one or more long chain ($C_{10}+$) monomeric organic intercalant compounds between planar layers of a swellable layered material, such as a phyllosilicate or other layered material, to expand the interlayer spacing of adjacent layers to at least about 5 Angstroms (Å), preferably at least about 10 Å. More particularly, the present invention is directed to intercalates formed with monomeric intercalant molecules that are long chain ($C_{10}+$ alkyl) monomeric organic compounds that have a dipole moment at one end of the molecule that is greater than the dipole moment of water (greater than 1.85 debyes). The intercalant molecules are sorbed on the internal surfaces between adjacent layers of the planar platelets of a layered material, such as a phyllosilicate, preferably a smectite clay, and, surprisingly, the end of the monomeric molecules having a dipole moment greater than the dipole moment of water coordinate surrounding $Na^+$ ions on the inner surface of the phyllosilicate platelets through an electrostatic attraction, e.g., Van Der Waals forces, to form rigid columns of the monomeric molecules that stand perpendicular to the platelet surfaces to provide surprisingly large basal spacings between adjacent phyllosilicate platelets with relatively few monomeric molecules. The adjacent, relatively widely spaced platelets of such intercalates, and the exfoliates thereof, therefore, have a very porous gallery of long chain ($C_{10}+$ alkyl) molecules extending perpendicularly from the platelets, resulting in increased sorption (absorption and/or adsorption) of both hydrophilic and hydrophobic molecules by the resulting intercalates and exfoliates thereof; excellent intercalates and exfoliates for combining with melt polymers (matrix thermoplastic and/or thermosetting polymers) for increased mechanical strength; increased oxygen impermeability in films and sheets; increased temperature resistance characteristics; and the like. The long chain ($C_{10}+$ alkyl), molecules expand the interlayer spacing of the phyllosilicate to at least about 5 Å, preferably at least about 10 Å, more preferably to at least about 20 Å, and most preferably to at least about 30–45 Å, up to about 100 Å, or disappearance of periodicity.

The intercalated long chain monomers surprisingly form a unique type of intercalate and exfoliate that includes rigid extending columns of long chain ($C_{10}+$ alkyl) monomer molecules that have long chain molecule ends extending perpendicularly from one platelet surface abutting long chain molecule ends extending perpendicularly from an adjacent platelet surface to hold the adjacent platelets more widely spaced, with fewer intercalant molecules than any intercalate heretofore known. The resulting intercalates are neither entirely organophilic nor entirely hydrophilic, but a combination of the two; have surprising sorption of hydrophilic and hydrophobic molecules; and easily can be exfoliated and combined as individual platelets with a polymer to form a composite material; or combined with a polar organic solvent carrier to form a viscous composition having a myriad of uses. The resulting intercalate or exfoliate; or polymer/intercalate or polymer/exfoliated platelet composite materials are useful as plasticizers; for providing increased viscosity and elasticity to thermoplastic and thermosetting polymers, e.g., for plasticizing polyvinyl chloride; for food wrap having improved gas impermeability; for electrical components; for food grade drink containers; for raising the viscosity of polar organic liquids; and for altering one or more physical properties of a matrix polymer, such as elasticity and temperature characteristics, e.g., glass transition temperature and high temperature resistance.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings of at least about 10–20 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is Synthesis and Properties of Two-Dimensional Nanostructures by Direct Intercalation of Polymer Melts in Layered Silicates, Richard A. Vaia, et al., *Chem. Mater.*, 5:1694–1696(1993). Also as disclosed in *Adv. Materials*, 7, No. 2: (1985), pp, 154–156, New Polymer Electrolyte Nanocomposites: Melt Intercalation of Poly(Ethylene Oxide) in *Mica-Type Silicates*, Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets, with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVA) and poly (ethylene oxide) (PEO) between montmorillonite clay platelets with little success. As described in Levy, et al., Interlayer Adsorption of Polyvinylpyrrolidone on Montinorillonite, Journal of Colloid and Interface Science, Vol. 50, No. 3, March 1975, pages 442–450, attempts were made to sorb PVP (40,000 average M.W.) between monojonic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyound a 20 Å basal spacing (e.g., 26 Å and 32 Å), at 5$^+$% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, Adsorption of Polyvinyl Alcohols by Montmorillonite, Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVA). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with one embodiment of the present invention, intercalates are prepared by contacting a phyllosilicate with a monomeric organic compound having a long chain alkyl radical ($C_{10}$+ alkyl) and having an electrostatic functionality on one end of the molecule that provides a dipole moment that is greater than the dipole moment of water. Exemplary of such electrostatic functionalities include a hydroxyl; a polyhydroxyl; a carbonyl such as carboxylic acids, and salts thereof; polycarboxylic acids and salts thereof; aldehydes; ketones; amines; amides; ethers; esters; lactams; lactones; anhydrides; nitrites; n-alkyl halides; pyridines; and mixtures thereof.

In accordance with an important feature of the present invention, best results are achieved by mixing the layered material with a polar monomeric organic intercalant compound, having a $C_{10}$+ alkyl group and a dipole moment on one end of the molecule greater than the dipole moment of water, or greater than 1.85 debyes (>1.85 D), in a concentration of at least about 2%, preferably at least about 5% by weight polar, long chain alkyl monomeric organic intercalant compound, more preferably at least about 10% by weight polar, long chain alkyl monomeric organic intercalant compound, and most preferably about 30% to about 80% by weight, based on the weight of polar, long chain alkyl monomeric organic intercalant compound and carrier (e.g., water, with or without an organic solvent for the polar, long chain alkyl monomeric compound) to achieve better sorption of the monomeric organic intercalant compound between the platelets of the layered material. Dipole moments can be found, or calculated, in accordance with the publication "Selected Values of Electric Dipole Moments for Molecules in the Gas Phase", Nelson, Lide and Maryott, National Reference Data Series—National Bureau of Standards (NSRDS-NBS 10), hereby incorporated by reference. The publication is available from the Superintendent of Documents, U.S. Government Printing Office, Washington, D.C., 20402. One debye unit (D)=$10^{-18}$ electrostatic units of charge×centimeters. The conversion factor to the Système International is 1D=3.33564 ×$10^{-24}$ coulombmeter. Regardless of the concentration of monomeric organic intercalant compound in aqueous liquid, the intercalating composition should have a polar, long chain monomeric organic intercalant compound:layered material weight ratio of at least 1:20, preferably at least 1:10, more preferably at least 1:5, and most preferably about 1:4 to achieve electrostatic complexing of the electrostatic monomeric organic intercalant compound with an inner surface of a platelet of the layered material to achieve efficient intercalation of the monomeric organic intercalant compound between adjacent platelets of the layered material. The polar, long chain ($C_{10}$+ alkyl) monomeric organic intercalant compound sorbed between and bonded to (complexed with) the silicate platelets causes surprising separation or added spacing between adjacent silicate platelets.

For simplicity of description, the above-described $C_{10}$+ alkyl monomeric organic intercalant compounds having at least one molecule end that has a dipole moment greater than the dipole moment of water are hereinafter called the "intercalant" or "intercalant monomer" or "monomer intercalant". The monomer intercalant will be sorbed sufficiently to increase the interlayer spacing of the phyllosilicate in the range of about 5 Å to about 100 Å, preferably at least about 10 Å for easier and more complete exfoliation, in a commercially viable process, regardless of the particular layered material, e.g., phyllosilicate, or intercalant monomer.

In accordance with the present invention, it has been found that a phyllosilicate, such as a smectite clay, can be intercalated sufficiently for subsequent exfoliation by sorption of organic monomer compounds that have an alkyl group of at least 10 carbon atoms, and include one end of the molecule having a dipole moment greater than the dipole moment of water to provide bonding between a polar end of one or two intercalant monomer molecules and the $Na^+$ cations of the inner surfaces of the platelets of the layered material, e.g., phyllosilicate. Sorption and metal cation attraction or bonding between two polar end groups of the intercalant monomer molecules and the interlayer $Na^+$ cations of the phyllosilicate; or the bonding between the interlayer $Na^+$ cations in hexagonal or pseudohexagonal rings of the smectite platelet layers and an intercalant monomer aromatic ring structure, is provided by a mechanism selected from the group consisting of ionic complexing; electrostatic complexing; chelation; hydrogen bonding; ion-dipole; dipole/dipole; Van Der Waals forces; and any combination thereof.

Such bonding, via one or more metal ($Na^+$) cations of the phyllosilicate sharing electrons with one or two electronegative atoms of one or two polar ends of $C_{10}$+ alkyl monomer intercalant molecules, on an inner surface of one or both adjacent phyllosilicate platelets surprisingly provides rigid intercalant monomer molecules extending perpendicularly from the phyllosilicate platelet surfaces, and increases the interlayer spacing between adjacent silicate platelets or other layered material to at least about 5 Å, preferably to at least about 10 Å, more preferably to at least about 20 Å, and most preferably in the range of about 30 Å to about 45 Å, while consuming surprisingly little monomer intercalant in relation to the increased basal spacing achieved. The electronegative atoms at the polar end of the intercalant monomer molecules that coordinate to surround the platelet Na$^+$ ions can be, for example, oxygen, sulfur, nitrogen, halogen, and combinations thereof.

Such intercalated phyllosilicates easily can be exfoliated into individual phyllosilicate platelets before or during admixture with a liquid carrier or solvent, for example, one or more monohydric alcohols, such as methanol, ethanol, propanol, and/or butanol; polyhydric alcohols, such as glycerols and glycols, e.g., ethylene glycol, propylene glycol, butylene glycol, glycerine and mixtures thereof; aldehydes; ketones; carboxylic acids; amines; amides; and other organic solvents, for delivery of the solvent in a thixotropic composition, or for delivery of any active hydrophobic or hydrophilic organic compound, such as a topically active pharmaceutical, dissolved or dispersed in the carrier or solvent, in a thixotropic composition; or the intercalates and/or exfoliates thereof can be admixed with a polymer or other organic monomer compound(s) or composition to increase the viscosity of the organic compound or provide a polymer/intercalate and/or polymer/exfoliate composition to enhance one or more properties of a matrix polymer.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes long chain alkyl ($C_{10}$+ alkyl) organic monomer molecules disposed between adjacent platelets of the Layered Material to increase the interlayer spacing between the adjacent platelets to at least about 5 Å, preferably at least about 10 Å.

"Intercalation" shall mean a process for forming an Intercalate.

"Intercalant Monomer" or "Intercalant" or "Monomer Intercalant" shall mean a monomeric organic compound that includes a long chain alkyl ($C_{10}$+ alkyl) group and includes, at one end of the molecule, a polar moiety that provides the molecule with a dipole moment that is greater than the dipole moment of water. Suitable polar moieties include, for example, a moiety selected from the group consisting of a hydroxyl; a polyhydroxyl; a carbonyl; a carboxylic acid; an amine; an amide; an ether; an ester; lactams; lactones; anhydrides; nitrites; n-alkyl halides; pyridines; and mixtures thereof that is sorbed between Platelets of the Layered Material and complexes with the Na$^+$ cations on the platelet surfaces to form an Intercalate.

"Intercalating Carrier" shall mean a carrier comprising water with or without an organic solvent used together with an Intercalant Monomer to form an Intercalating Composition capable of achieving Intercalation of the Layered Material.

"Intercalating Composition" or "Intercalant Composition" shall mean a composition comprising an Intercalant Monomer, an Intercalating Carrier for the Intercalant Monomer, and a Layered Material.

"Exfoliate" or "Exfoliated" shall mean individual platelets of an Intercalated Layered Material so that adjacent platelets of the Intercalated Layered Material can be dispersed individually throughout a carrier material, such as water, a polymer, an alcohol or glycol, or any other organic solvent.

"Exfoliation" shall mean a process for forming an Exfoliate from an Intercalate.

"Nanocomposite" shall mean a mixture that includes a monomer, polymer, oligomer, or copolymer having dispersed therein a plurality of individual platelets obtained from an exfoliated Intercalated Layered Material.

"Matrix Monomer" shall mean a monomer that the Intercalate or Exfoliate is mixed with or dispersed.

"Matrix Polymer" shall mean a thermoplastic or thermosetting polymer in which the Intercalate and/or Exfoliate is mixed or dispersed to form a Nanocomposite.

SUMMARY OF THE INVENTION

In brief, the present invention is directed to intercalates and exfoliates thereof formed by contacting a layered phyllosilicate with a long chain alkyl ($C_{10}$+ alkyl) organic monomer (intercalant monomer), having an alkyl group of at least 10 carbon atoms, and having a dipole moment at one end of the molecule that is greater than the dipole moment of water. Suitable long chain intercalant monomers include a polar end having at least one hydroxyl functionality; a carbonyl functionality; a carboxylic acid functionality; an amine functionality; an amide functionality; an ether functionality; an ester functionality; lactams; lactones; anhydrides; nitrites; n-alkyl halides; and/or pyridines; to sorb or intercalate the intercalant monomer or mixtures of intercalant monomers between adjacent platelets of a layered inorganic material, e.g., a phyllosilicate.

Sufficient intercalant monomer is sorbed between adjacent phyllosilicate platelets to expand the spacing between adjacent platelets (interlayer spacing) to a distance of at least about 5 Å, preferably to at least about 10 Å (as measured after water removal to a maximum water content of 5% by weight, based on the dry weight of the layered material) and more preferably in the range of about 30–45 Å, so that the intercalate easily can be exfoliated, sometimes naturally without shearing being necessary. At times, the intercalate requires shearing that easily can be accomplished, e.g., when mixing the intercalate with a polar organic solvent carrier, such as a polar organic hydrocarbon, and/or with a polymer melt to provide a platelet-containing composite material or nanocomposite—the platelets being obtained by exfoliation of the intercalated layered-material, e.g., phyllosilicate.

The intercalant monomer has an affinity for the Na$^+$ cations on the inner surfaces of the phyllosilicate platelets so that it is sorbed between, and is maintained associated with the silicate platelets in the interlayer spaces, and is complexed to the platelet surfaces after exfoliation. In accordance with the present invention, the intercalant monomer should include a molecule end that has a dipole moment greater than the dipole moment of water to be sufficiently bound to the phyllosilicate platelet surface, it is hereby theorized, by a mechanism selected from the group consisting of ionic complexing; electrostatic complexing; chelation; hydrogen bonding; ion-dipole; dipole/dipole; Van Der Waals forces; and any combination thereof. Such bonding, via a metal cation, e.g., Na$^+$, of the phyllosilicate inner platelet surface sharing electrons with electronegative atoms of a polar end of the long chain, monomeric organic intercalant compound, provides adherence between the intercalant monomer molecules and the platelet inner surfaces of the layered material. The electronegative atoms on the polar end of the intercalant monomer can be, for example, oxygen, sulfur, nitrogen, halogen, and combinations thereof. Atoms having a sufficient electronegativity to bond to metal cations on the inner surface of the platelets have an electronegativity of at least 2.0, and preferably at least 2.5, on the Pauling Scale. A "polar moiety" or "polar group" is defined as a moiety having two adjacent atoms that are bonded covalently and have a difference in electronegativity of at least 0.5 electronegativity units on the Pauling Scale.

Such intercalant monomers have sufficient affinity for the phyllosilicate platelets to maintain sufficient interlayer spacing for exfoliation, without the need for coupling agents or spacing agents, such as the onium ion or silane coupling agents disclosed in the above-mentioned prior art. Consequently, in accordance with the present invention, the phyllosilicate inner platelet surfaces need not be first reacted with an onium ion or silane coupling agent in order to complex the intercalant monomer to the inner platelet surfaces. A schematic representation of the charge distribution on the surfaces of a sodium montmorillonite clay is shown in FIGS. 1–3. As shown in FIGS. 2 and 3, the location of surface $Na^+$ cations with respect to the location of oxygen (Ox), Mg, Si and Al atoms (FIGS. 1 and 2) results in a clay surface charge distribution as schematically shown in FIG. 3. The positive-negative charge distribution over the entire clay surface provides for excellent dipole/dipole attraction of the above-described long chain, polar organic monomer intercalants on the surfaces of the clay platelets.

The intercalate-containing and/or exfoliate-containing compositions can be in the form of a stable thixotropic gel that is not subject to phase separation and can be used to deliver any active materials, such as in the cosmetic, hair care and pharmaceutical industries. The layered material is intercalated and optionally exfoliated by contact with an intercalant monomer and water, such as by mixing and/or extruding the intercalant composition to intercalate the monomer between adjacent phyllosilicate platelets and optionally separate (exfoliate) the layered material into individual platelets. The amount of water varies, depending upon the amount of shear imparted to the layered material in contact with the intercalant monomer and water. In one method, the intercalating composition is pug milled or extruded at a water content of about 25% by weight to about 50% by weight water, preferably about 35% to about 40% by weight water, based on the dry weight of the layered material, e.g., clay. In another method, the clay and water are slurried, with at least about 25% by weight water, preferably at least about 65% by weight water, based on the dry weight of the layered material, e.g., preferably less than about 20% by weight clay in water, based on the total weight of layered material and water, more preferably less than about 10% layered material in water, with the addition of about 2% by weight to about 90% by weight intercalant monomer, based on the dry weight of the layered material.

Sorption of the intercalant monomer should be sufficient to achieve expansion of adjacent platelets of the layered material (when measured dry) to an interlayer spacing of at least about 5 Å, preferably to a spacing of at least about 10 Å, more preferably a spacing of at least about 20 Å, and most preferably a spacing of about 30–45 Å. To achieve intercalates that can be exfoliated easily using the monomer intercalants disclosed herein, the weight ratio of intercalant monomer to layered material, preferably a water-swellable smectite clay such as sodium bentonite, in the intercalating composition should be at least about 1:20, preferably at least about 1:12 to 1:10, more preferably at least about 1:5, and most preferably about 1:5 to about 1:3. It is preferred that the concentration of intercalant monomer in the intercalating composition, based on the total weight of intercalant monomer plus intercalant carrier (water plus any organic liquid solvent) in the intercalating composition is at least about 15% by weight, more preferably at least about 20% by weight intercalant monomer, for example about 20–30% to about 90% by weight intercalant monomer, based on the weight of intercalant monomer plus intercalating carrier in the intercalating composition during intercalation of the layered material.

Surprising results are achieved when the molar ratio of intercalant monomer to phyllosilicate (sodium) are at least 2:1, particularly at 3:1 or greater. Basal spacings that result from such molar ratios are far greater than have ever been achieved using the same ratios of other intercalant monomers.

Interlayer spacings sufficient for exfoliation are achieved by direct intercalation of the above-defined intercalant monomers, without prior sorption of an onium or silane coupling agent, and provide easier and more complete exfoliation for or during incorporation of the platelets into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the platelets with polar solvents in modifying rheology, e.g., of cosmetics, oil-well drilling fluids, paints, lubricants, especially food grade lubricants, in the manufacture of oil and grease, and the like. Such intercalates and/or exfoliates also are especially useful in admixture with matrix thermoplastic or thermosetting polymers in the manufacture of polymeric articles from the polar organic carrier/polymer/intercalate and/or platelet composite materials.

Once exfoliated, the platelets of the intercalate are predominantly completely separated into individual platelets and the originally adjacent platelets no longer are retained in a parallel, spaced disposition, but are free to move as predominantly individual intercalant monomer-coated (continuously or discontinuously) platelets throughout a polymer melt for enhancing one or more properties, such as strength or temperature resistance; or for mixing with a carrier or solvent material to maintain viscosity and thixotropy of the carrier material. The predominantly individual phyllosilicate platelets, having their platelet surfaces complexed with intercalant monomer molecules, are randomly, homogeneously and uniformly dispersed, predominantly as individual platelets, throughout the carrier or solvent to achieve new and unexpected viscosities in the carrier/platelet compositions even after addition of an active organic compound, such as a cosmetic component or a medicament, for administration of the active organic compound(s) from the composition.

As recognized, the thickness of the exfoliated, individual platelets (about 10 Å) is relatively small compared to the size of the flat opposite platelet faces. The platelets have an aspect ratio in the range of about 200 to about 2,000. Dispersing such finely divided platelet particles into a polymer melt or into a polar organic liquid carrier imparts a very large area of contact between polymer melt or carrier and platelet particles, for a given volume of particles in the composite, and a high degree of platelet homogeneity in the composite material. Platelet particles of high strength and modulus, dispersed at sub-micron size (nanoscale), impart greater mechanical reinforcement to a polymer and a higher viscosity to a polar organic liquid carrier than do comparable loadings of conventional reinforcing fillers of micron size, and can impart lower permeability to matrix polymers than do comparable loadings of conventional fillers.

BRIEF DESCRIPTION OF THE DRAWINGS

FIG. 1 is a schematic representation of a top view of sodium montmorillonite clay showing the ionic charge distribution for the sodium montmorillonite clay top and interlayer surfaces showing $Na^+$ ions as the largest circles as well as magnesium and aluminum ions and Si and oxygen (Ox) atoms disposed beneath the sodium ions;

FIG. 2 is a side view (bc-projection) of the schematic representation of FIG. 1;

FIG. 3 is a schematic representation of the charge distribution on the surfaces of sodium montmorillonite clay platelets showing the distribution of positive and negative charges on the clay platelet surfaces as a result of the natural disposition of the Na, Mg, Al, Si, and oxygen (Ox) atoms of the clay shown in FIGS. 1 and 2;

DETAILED DESCRIPTION OF THE PREFERRED EMBODIMENTS

Figure 4:
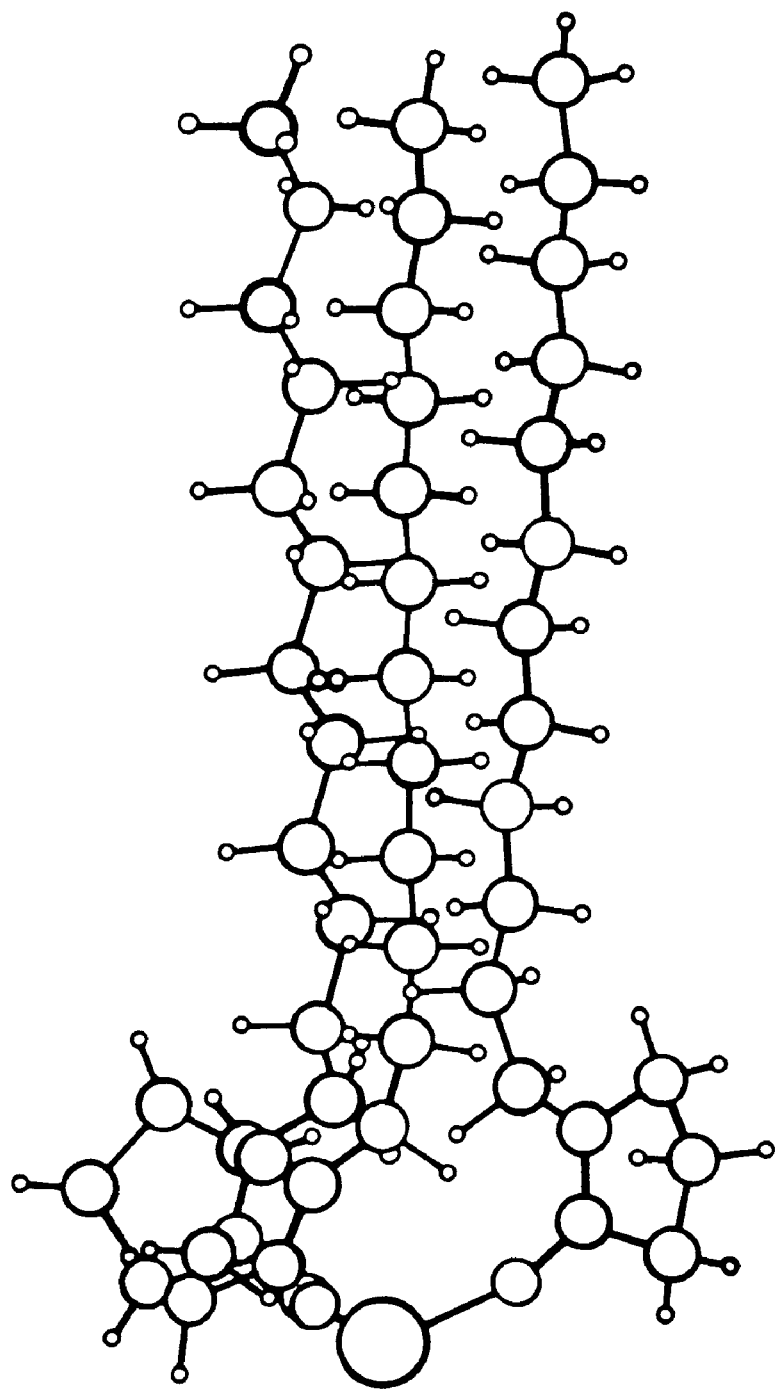
FIG. 4 is a schematic representation of a side view of a sodium cation (largest ball) showing three dodecyl pyrrolidone intercalant monomer molecules ionically complexed and coordinated therearound, with the long chain ($C_{12}$) alkyl groups extending perpendicularly from a montmorillonite platelet surface.

To form the intercalated and exfoliated materials of the present invention, the layered material, e.g., the phyllosilicate, should be swelled or intercalated by sorption of an intercalant monomer that includes an alkyl group having at least 10 carbon atoms, and includes a second molecule end that has a dipole moment that is greater than the dipole moment of water. In accordance with a preferred embodiment of the present invention, the phyllosilicate should include at least 4% by weight water, up to about 5,000% by weight water, based on the dry weight of the phyllosilicate, preferably about 7% to about 100% water, more preferably about 25% to about 50% by weight water, prior to or during contact with the intercalant monomer to achieve sufficient intercalation for exfoliation. Preferably, the phyllosilicate should include at least about 4% by weight water before contact with the intercalating carrier for efficient intercalation. The amount of intercalant monomer in contact with the phyllosilicate from the intercalating composition, for efficient exfoliation, should provide an intercalant monomer/phyllosilicate weight ratio (based on the dry weight of the phyllosilicate) of at least about 1:20, preferably at least about 3.2/20, and more preferably about 4–14/20, to provide efficient sorption and complexing (intercalation) of the intercalant monomer between the platelets of the layered material, e.g., phyllosilicate.

The monomer intercalants are introduced in the form of a solid or liquid composition (neat or aqueous, with or without an organic solvent, e.g., an aliphatic hydrocarbon, such as heptane) having an intercalant monomer concentration of at least about 2%, preferably at least about 5% by weight intercalant monomer, more preferably at least about 50% to about 100% by weight intercalant monomer in the intercalating composition, based on the dry weight of the layered material, for intercalant monomer sorption. The intercalant monomer can be added as a solid with the addition to the layered material/intercalant monomer blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The monomer intercalants may be introduced into the spaces between every layer, nearly every layer, or at least a predominance of the layers of the layered material such that the subsequently exfoliated platelet particles are preferably, predominantly less than about 5 layers in thickness; more preferably, predominantly about 1 or 2 layers in thickness; and most preferably, predominantly single platelets.

Any swellable layered material that sufficiently sorbs the intercalant monomer to increase the interlayer spacing between adjacent phyllosilicate platelets to at least about 5 Å, preferably to at least about 10 Å (when the phyllosilicate is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Other layered materials having little or no charge on the layers may be useful in this invention provided they can be intercalated with the intercalant monomers to expand their interlayer spacing to at least about 5 Å, preferably to at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

The amount of intercalant monomer intercalated into the swellable layered materials useful in this invention, in order that the intercalated layered material platelets surfaces sufficiently complex with the intercalant monomer molecules such that the layered material may be easily exfoliated or delaminated into individual platelets, may vary substantially between about 2%, preferably at least about 10%, and about 90%, based on the dry weight of the layered silicate material. In the preferred embodiments of the invention, amounts of monomer intercalants employed, with respect to the dry weight of layered material being intercalated, will preferably range from about 8 grams of intercalant monomer:100 grams of layered material (dry basis), preferably at least about 10 grams of intercalant monomer:100 grams of layered material to about 80–90 grams intercalant monomer:100 grams of layered material. More preferred amounts are from about 20 grams intercalant monomer:100 grams of layered material to about 60 grams intercalant monomer:100 grams of layered material (dry basis).

The monomer intercalants are introduced into (sorbed within) the interlayer spaces of the layered material in one of two ways. In a preferred method of intercalating, the layered material is intimately mixed, e.g., by extrusion or pug milling, to form an intercalating composition comprising the layered material, in an intercalant monomer/water solution, or intercalant monomer, water and an organic carrier for the intercalant monomer. To achieve sufficient intercalation for exfoliation, the layered material/intercalant monomer blend contains at least about 8% by weight, preferably at least about 10% by weight intercalant monomer, based on the dry weight of the layered material. The intercalant monomer carrier (preferably water, with or without an organic solvent) can be added by first solubilizing or dispersing the intercalant monomer in the carrier; or a dry intercalant monomer and relatively dry phyllosilicate (preferably containing at least about 4% by weight water) can be blended and the intercalating carrier added to the blend, or to the phyllosilicate prior to adding the dry intercalant monomer. In every case, it has been found that surprising sorption and complexing of intercalant monomer between platelets is achieved at relatively low loadings of intercalating carrier, especially $H_2O$, e.g., at least about 4% by weight water, based on the dry weight of the phyllosilicate. When intercalating the phyllosilicate in slurry form (e.g., 900 pounds water, 100 pounds phyllosilicate, 25 pounds intercalant monomer) the amount of water can vary from a preferred minimum of at least about 30% by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant monomer, either dry or in solution. Sorption of the monomer intercalant molecules may be performed by exposing the layered material to dry or liquid intercalant monomers in the intercalating composition containing at least about 2% by weight, preferably at least about 5% by weight intercalant monomer, more preferably at least about 50% intercalant monomer, based on the dry weight of the layered material. Sorption may be aided by exposure of the intercalating composition to heat, pressure, ultrasonic cavitation, or microwaves.

In accordance with another method of intercalating the intercalant monomer between the platelets of the layered material and exfoliating the intercalate, the layered material, containing at least about 4% by weight water, preferably about 10% to about 15% by weight water, is blended with a water and/or organic solvent solution of an intercalant monomer in a ratio sufficient to provide at least about 8% by weight, preferably at least about 10% by weight intercalant monomer, based on the dry weight of the layered material. The blend then preferably is extruded for faster intercalation of the intercalant monomer with the layered material.

The intercalant monomer has an affinity for the phyllosilicate, as shown in FIG. 4, so that it is sorbed between, and is maintained associated with the cations on the inner surfaces of the silicate platelets, in the interlayer spaces, and remains complexed to the platelet surface after exfoliation. In accordance with the present invention, the intercalant monomer should include a polar end having a dipole moment greater than the dipole moment of water to be sufficiently bound to the platelet surfaces, it is hereby theorized, by a mechanism selected from the group consisting of ionic complexing; electrostatic complexing; chelation; hydrogen bonding; ion-dipole; dipole/dipole; Van Der Waals forces; and any combination thereof. Such bonding, via a metal cation (e.g., $Na^+$) of the phyllosilicate sharing electrons with electronegative atoms of one or monomer polar intercalant molecule ends of one or two intercalant monomer molecules, to an inner surface of the phyllosilicate platelets provides adherence between the polar intercalant monomer molecule ends and the platelet inner surfaces of the layered material. Such intercalant monomers have sufficient affinity for the phyllosilicate platelets to maintain sufficient interlayer spacing for exfoliation, without the need for coupling agents or spacing agents, such as the onium ion or silane coupling agents disclosed in the above-mentioned prior art.

As shown in FIGS. 1–3, the disposition of surface $Na^+$ ions with respect to the disposition of oxygen (Ox), Mg, Si, and Al atoms, and the natural clay substitution of $Mg^{+2}$ cations for $Al^{+3}$ cations, leaving a net negative charge at the sites of substitution, results in a clay surface charge distribution as shown in FIG. 3. This alternating positive to negative surface charge over spans of the clay platelets surfaces, and on the clay platelet surfaces in the interlayer spacing, provide for excellent dipole/dipole attraction of a polar intercalant monomer molecule, as shown schematically in FIG. 4, for intercalation of the clay and for bonding or complexing of such polar molecules on the platelet surfaces, after exfoliation.

It is preferred that the platelet loading be less than about 10% for purposes of increasing the viscosity of an organic liquid carrier. Platelet particle loadings within the range of about 0.05% to about 40% by weight, preferably about 0.5% to about 20%, more preferably about 1% to about 10% of the composite material significantly enhances viscosity. In general, the amount of platelet particles incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with an important feature of the present invention, the intercalated phyllosilicate can be manufactured in a concentrated form, e.g., 10–90%, preferably 20–80% intercalant monomer with or without another polar organic compound carrier and 10–90%, preferably 20–80% intercalated phyllosilicate that can be dispersed in the polar organic carrier and exfoliated before or after addition to the carrier to a desired platelet loading.

Polar organic compounds containing one or more hydroxy functionalities are suitable for use as intercalant monomers so long as the hydroxy end of the molecule has a dipole moment greater than the dipole moment of water (>1.85 D), and the polar organic compounds have a long chain ($C_{10}+$) alkyl radical. Examples include long chain ($C_{10}+$) alcohols having a dipole moment greater than 1.85 D, including aliphatic alcohols; aromatic alcohols; aryl substituted aliphatic alcohols; alkyl substituted aromatic alcohols; and polyhydric alcohols, such as the phenols, containing a long chain ($C_{10}+$) alkyl group.

Detergent range aliphatic alcohols having an alkyl radical of at least 10 carbon atoms include the $C_{10}$–$C_{24}$ alcohols, such as the $C_{10}$–$C_{18}$ alcohols manufactured from coconut, tallow and/or palm oils; $C_{16}$, $C_{18}$ oleyl alcohols; $C_{10}$–$C_{15}$ mixed alcohols, $C_{10}$–$C_{22}$ mixed alcohols; and $C_{13}$, $C_{15}$ alcohols manufactured from ethylene and other olefins. Additional detergent range alcohols include lauryl alcohol; myristyl alcohol; cetyl alcohol; tallow alcohol; stearyl alcohol; and oleyl alcohol. Branched detergent range alcohols, such as tridecyl alcohol ($C_{13}H_{28}O$), consisting predominantly of tetramethyl-1-nonanols also are suitable as the intercalant monomer and/or as a polar organic liquid carrier. Plasticizer range alcohols include decanol ($C_{10}H_{22}O$); and tridecyl alcohol ($C_{13}H_{28}O$).

The nanocomposites containing one or more detergent range alcohols as the matrix monomer (the phyllosilicate platelets are dispersed in one or more detergent range alcohols as the polar organic liquid carrier) are useful, for example, the following industries shown in Table 1.

TABLE 1

| INDUSTRY | USE |
|---|---|
| detergent | emollient, foam control, opacifier, softener |
| petroleum and lubrication | drilling mud |
| agriculture | evaporation suppressant |
| plastics | mold-release agent, antifoam, emulsion polymerization agent, lubricant |
| textile | lubricant, foam control, anti-static agent, ink ingredient; fabric softeners |
| cosmetics | softener, emollient |
| pulp and paper | foam control |
| food | water evaporation suppressant |
| rubber | plasticizer, dispersant |
| paint and coatings | foam control |

TABLE 1-continued

| INDUSTRY | USE |
|---|---|
| metal working | lubricant, rolling oil |
| mineral processing | flotation agent |

The plasticizer range alcohols ($C_{10}+$) are primarily used in plasticizers, e.g., for polyvinyl chloride (PVC) and other resins, but they also have a wide range of uses in other industrial and consumer products, as shown in Table 2.

TABLE 2

| INDUSTRY | USE |
|---|---|
| plastics | emulsion polymerization |
| petroleum and lubrication | defoamer |
| agriculture | stabilizer, tobacco sucker control, herbicide, fungicide |
| mineral processing | solvent, extractant, antifoam |
| textile | leveling agent, defoamer |
| coatings | solvent, smoothing agent |
| metal working | solvent, lubricant, protective coating |
| chemical processing | antifoam, solvent |
| food | moisturizer |
| cosmetics | perfume ingredient |

Representative Straight-Chain Alkanoic Acids, $C_nH_{2n}O_2$ Systematic Name (Common Name)

Decanoic ([capric]); undecanoic ([undecylic]); dodecanoic (lauric); tridecanoic ([tridecylic]); tetradecanoic (myristic); pentadecanoic ([pentadecylic]); hexadecanoic (palmitic); heptadecanoic (margaric); octadecanoic (stearic); nonadecanoic ([nonadecyclic]); eicosanoic (arachidic); docosanoic (behenic); tetracosanoic (lignoceric); hexacosanoic (cerotic); octacosanoic (montanic); triacontanoic (melissic); tritriacontanoic (psyllic); and pentatriacontanoic (ceroplastic).

Representative Straight-Chain Alkenoic Acids, $C_nH_{(2n-2)}O_2$ Systematic Name (Common Name)

Trans-4-decenoic; cis-4-decenoic; 9-decenoic (caproleic); 10-undecenoic (undecylenic); trans-3-dodecenoic (linderic); tridecenoic; cis-9-tetradecenoic (myristoleic); pentadecenoic; cis-9-hexadecenoic (cis-9-palmitoleic); trans-9-hexadecenoic (trans-9-palmitoleic); 9-heptadecenoic; cis-6-octadecenoic (petroselinic); trans-6-octadecenoic (petroselaidic); cis-9-octadecenoic (oleic); trans-9-octadecenoic (elaidic); cis-11-octadecenoic; trans-11-octadecenoic (vaccenic); cis-5-eicosenoic; cis-9-eicosenoic (gadoleic); cis-11-docosenoic (cetoleic); cis-13 docosenoic (erucic); trans-13-docosenoic (brassidic); cis-15-tetracosenoic (selacholeic); cis-17-hexacosenoic (ximenic); and cis-21-triacontenoic (lumequeic).

Representative Polyunsaturated Fatty Acids Systematic Name (Common Name)

Representative Dienoic Acids, $C_nH_{2n-4}O_2$

Trans- 2,4-decadienoic, trans-2,4-dodecadienoic; cis-9, cis-12-octadecadienoic (linoleic); trans-9,trans-12-octadecadienoic (linolelaidic); 5,6-octadecadienoic (laballenic); and 5,13-docosadienoic.

Representative Trienoic Acids, $C_nH_{2n-6}O_2$ 6,10,14-hexadecatrienoic (hiragonic); cis-9,cis-12,cis-15-octadecatrienoic (linolenic); cis-9,trans-11, trans-13-octadecatrienoic (α-eleostearic); trans-9,trans-11,trans-13-octadecatrienoic (β-eleostearic); cis-9,cis-11,trans-13-octadecatrienoic (punicic); and trans-9,trans-12, trans-15-octadecatrienoic (linolenelaidic).

Representative Tetraenoic Acids, $C_nH_{2N-8}O_2$ 4,8,12,15 octadecatetraenoic (moroctic); cis-9,trans-11, trans-13, cis-15-octadecatetraenoic (α-parinaric); trans-9, trans-11, trans-13,trans-15-octadecatetraenoic (β-parinaric); and 5,8,11,14-eicosatetraenoic (arachidonic).

Representative Substituted Acids Systematic Name (Common Name)

2,15,16-trihydroxyhexadecanoic (ustilic); 9,10,16-trihydroxyhexadecanoic (aleuritic); 16-hydroxy-7-hexadecenoic (ambrettolic); 12-hydroxy-cis-9-octadecenoic (ricinoleic); 12-hydroxy-trans-9-octadecenoic (ricinelaidic); 4-oxo-9,11,13-octadecatrienoic (licanic); 9,10-dihydroxyoctadecanoic; 12-hydroxyoctadecanoic; 12-oxooctadecanoic; 18-hydroxy-9,11,13-octadecatrienoic (kamlolenic); 12,13-epoxy-cis-9-octadecenoic (vernolic); 8-hydroxy-trans-11-octadecene-9-ynoic (ximenynolic); 8-hydroxy-17-octadecene-9,11-diynoic (isanolic); and 14-hydroxycis-11-eicosenoic (lesquerolic).

Representative Long Chain ($C_{10}+$) Carboxylic Acids And Uses

| ACID | USES |
| --- | --- |
| canola | surfactants |
| castor oil acids (ricinoleic, 12-hydroxystearic) | lubricating greases |
| coconut oil acids | surfactants, soap |
| hydrogenated and/or separated tallow-based acids | metallic stearates (plastic lubricants), tires, candles, crayons, cosmetics |
| soybean oil acids | alkyd resins (paint) |
| tall oil acids 2% or more rosin | alkyd resins, ore flotation |
| less than 2% tallow fatty acids | soap, lubricants, fabric softeners, asphalt emulsifiers, synthetic rubber, plastics |
| capric | synthetic lubricants, medium-chain triglycerides |
| caprylic | synthetic lubricants, medium-chain triglycerides |
| caprylic-capric blend | synthetic lubricants, medium-chain triglycerides |
| lauric, 95% (dodecanoic) | surfactants, soap |
| myristic, 95% (tetradecanoic) | esters for cosmetics, lotions |
| oleic | surfactants, lubricants, plasticizers |
| palmitic, 90% | esters for personal care products |
| pelargonic (nonanoic) | synthetic lubricants, |
| stearic, 90% | plasticizers, alkyd resins, ore flotation |

Trialkylacetic Acids

Trialkylacetic acids are characterized by the following structure:

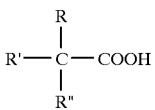

in which R, R', and R" are $C_xH_{2x+1}$, with $x \geq 1$, and wherein at least one of the R, R' and R" have at least 10 carbon atoms. The series, the products are typically mixtures of isomers, resulting from the use of mixed isomer feedstocks and the chemical rearrangements that occur in the manufacturing process.

The trialkylacetic acids have a number of uses in areas such as polymers, pharmaceuticals, agricultural chemicals, cosmetics, and metal-working fluids. Commercially important derivatives of these acids include acid chlorides, peroxyesters, metal salts, vinyl esters, and glycidyl esters.

The $C_{10}$ trialkylacetic acids, referred to as neodecanoic acid or as Versatic 10, are liquids at room temperature. These materials are typically mixtures of isomers.

Metal salts of neodecanoic acid have also been used as catalysts in the preparation of polymers. For example, bismuth, calcium, barium, and zirconium neodecanoates have been used as catalysts in the formation of polyurethane elastomers. Magnesium neodecanoate is one component of a catalyst system for the preparation of polyolefins; vanadium, cobalt, copper, or iron neodecanoates have been used as curing catalysts for conjugated-diene butyl elastomers.

The metal salts of neodecanoic acid have found wide usage as driers for paints and inks. Metal neodecanoates that are used include silver, cobalt and zirconium, along with lead, copper, manganese, and zinc.

Neodecanoic acid is also used as the carrier for metals in poly(vinyl chloride) heat stabilizers. Metals used in this application include barium, cadmium, and zinc. Tin as the neodecanoate salt has also been claimed as a heat stabilizer for maleic anhydride.

One of the growing uses for neodecanoic acid has been in the preparation of adhesion promoters for radial tires. In this application, cobalt or nickel neodecanoate, along with other components, is used during tire manufacture to promote the adhesion or bonding of the rubber to the steel cord. The result is high adhesive strength, good thermal aging resistance and improved resistance to moisture aging.

Neodecanoic acid and its esters are used in cosmetics as emollients, emulsifiers, and solubilizers. Zinc or copper salts of neoacids are used as preservatives for wood.

Aldehydes

Representative aldehydes suitable as the intercalant monomer and/or as the polar organic carrier in accordance with the present invention include the following:
decyl aldehyde; dodecyl aldehyde; octodecyl aldehyde; eicosan aldehyde; phenyl acetaldehyde; and the like.

Uses

Fatty aldehydes are used in nearly all perfume types and aromas. Polymers and copolymers of aldehydes exist and are of commercial significance.

Ketones

Suitable ketones are the organic compounds that contain one or more carbonyl groups bound to two aliphatic, aromatic, or alicyclic substituents, and are represented by the general formula

wherein R and/or R' is an alkyl group having at least 10 carbon atoms.

Amines and Amides

Polar organic compounds containing one or more amine or amide functionalities that are suitable for use as intercalate monomers and/or as the organic liquid carrier (matrix monomer) in accordance with the present invention include all organic amines and/or amides, such as the alkylamines; aminocycloalkanes and substituted aminocycloalkanes; cycloaliphatic diamines; fatty amines; and fatty amides, having a long chain ($C_{10}+$) alkyl group and having a dipole moment greater than the dipole moment of water.

Amines and amides are suitable alone, or in admixture, as the intercalant monomer(s) and/or as the organic solvent carrier (matrix monomer), for intercalation of the phyllosilicate and/or for admixture with the exfoliated individual platelets of the layered material in producing the nanocomposite of the present invention. The amines and amides can be any primary, secondary and/or tertiary amines or amides; including the long chain alkyl ($C_{10}+$) aliphatic amines; $C_{10}+$ alkylamines; fatty amines; $C_{10}+$ alkyl aromatic amines; $C_{10}+$ alkyl diarylamines; $C_{10}+$ alkyl substituted alkanolamines; and the like.

Examples of suitable amines that are useful as the intercalant monomer used for intercalation and exfoliation of the layered silicate materials, and/or as the polar organic carrier for admixture with the individual platelets in forming nanocomposite compositions are as follows:

| REPRESENTATIVE FATTY AMINES | |
|---|---|
| FATTY AMINE | MOLECULAR FORMULA |
| REPRESENTATIVE PRIMARY AMINES | |
| cocoalkylamines | |
| 1-dodecylamine | $C_{12}H_{27}N$ |
| 1-hexadecylamine | $C_{16}H_{35}N$ |
| 1-octadecylamine | $C_{18}H_{39}N$ |
| oleylamine | $C_{18}H_{37}N$ |
| soyaalkylamines | |
| tallowalkylamines | |
| hydrogenated tallowalkylamines | |
| REPRESENTATIVE SECONDARY AMINES | |
| dicocoalkylamines | |
| di-n-dodecylamine | $C_{24}H_{51}N$ |
| di-n-hexadecylamine | $C_{32}H_{67}N$ |
| di-n-octadecylamine | $C_{36}H_{75}N$ |
| ditallowalkylamines | |
| dihydrogenated tallowalkylamines | |
| REPRESENTATIVE TERTIARY AMINES | |
| Alkyldimethyl | |
| cocoalkyldimethylamines | |
| dimethyl-n-octylamine | $C_{10}H_{23}N$ |
| dimethyl-n-decylamine | $C_{12}H_{27}N$ |
| dimethyl-n-dodecylamine | $C_{14}H_{31}N$ |
| dimethyl-n-tetradecylamine | $C_{16}H_{35}N$ |
| dimethyl-n-hexadecylamine | $C_{18}H_{39}N$ |
| dimethyl-n-octadecylamine | $C_{20}H_{43}N$ |
| dimethyloleylamine | $C_{20}H_{41}N$ |

| REPRESENTATIVE FATTY AMINES | |
|---|---|
| FATTY AMINE | MOLECULAR FORMULA |
| Dialkylmethyl | |
| di-n-decylmethylamine | $C_{21}H_{45}N$ |
| dicocoalkylmethylamines | |
| dihydrogenated tallowalkylmethylamines | |
| Trialkyl | |
| tri-n-octylamine | $C_{24}H_{51}N$ |
| tri-n-dodecylamine | $C_{36}H_{75}N$ |
| tri-n-hexadecylamines | |

Nonocomposite Uses

Fatty amines and chemical products derived from the amines are used in many industries. Uses for the nitrogen derivatives are as follows: fabric softeners, oil field chemicals, asphalt emulsifiers, petroleum additives, and mining.

Amine salts, especially acetate salts prepared by neutralization of a fatty amine with acetic acid, are useful as flotation agents (collectors), corrosion inhibitors, and lubricants.

Fatty amines and derivatives are widely used in the oil field, as corrosion inhibitors, surfactants, emulsifying/deemulsifying and gelling agents. In the mining industry, amines and diamines are used in the recovery and purification of minerals, e.g., by flotation. A significant use of fatty diamines is as asphalt emulsifiers for preparing asphalt emulsions. Diamines have also been used as epoxy curing agents, corrosion inhibitors, gasoline and fuel oil additives, and pigment wetting agents. In addition, derivatives of the amines, amphoterics, and long-chain alkylamines are used as anionic and cationic surfactants in the personal care industry.

The amides including, primary, secondary and tertiary amides are useful in accordance with the present invention as intercalant monomers and/or as polar organic carriers that the individual phyllosilicate platelets are dispersed in. Representative primary fatty amides are as follows:

| PRIMARY FATTY AMIDE ($RCONH_2$) | | |
|---|---|---|
| Common Name | Molecular Formula | IUPAC Name |
| ALKYL | | |
| lauramide | $C_{12}H_{25}NO$ | dodecylamide |
| myristamide | $C_{14}H_{29}NO$ | tetradecylamide |
| palmitamide | $C_{16}H_{33}NO$ | hexadecylamide |
| stearamide | $C_{18}H_{37}NO$ | |
| ALKENYL | | |
| palmitoleamide | $C_{16}H_{31}NO$ | hexadecenamide |
| oleamide | $C_{18}H_{35}NO$ | 9-octadecenamide |
| linoleamide | $C_{18}H_{33}NO$ | 9,12-octadecadienamide |

Polar organic compounds having a long chain ($C_{10}+$) alkyl group, and containing one or more ether or ester functionalities that are suitable for use as intercalate monomers and/or as the organic liquid carrier (matrix monomer) in accordance with the present invention include the organic ethers and/or esters, such as the saturated, unsaturated, cyclic, aromatic, and carboxylic ethers and esters that contain a $C_{10}+$ alkyl group and having a polar end group that provides the molecule with a dipole moment greater than the dipole moment of water.

Representative Alkyl Nitriles

Suitable nitriles having an alkyl radical of at least 10 carbon atoms, and a dipole moment greater that the dipole moment of water include undecanonitrile ($CH_3(CH_2)_9CN$); dodecanonitrile (or lauronitrile) ($CH_3(CH_2)_{11}CN$); myristonitrile ($CH_3(CH_2)_{12}CN$); pentadecanonitrile ($CH_3(CH_2)_{13}CN$); n-heptadecanonitrile ($CH_3(CH_2)_{15}CN$); n-nonadecanitrile ($CH_3(CH_2)_{17}CN$); and mixtures thereof.

Representative N-Alkyl Lactams, Including N-Alkyl Pyrrolidones and Caprolactams

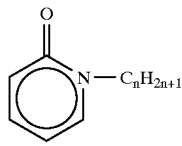

n=at least 10, preferably 10–20.

Representative Pyridines

Suitable pyridines include dodecylpyridinium chloride ($C_5H_5NC_{12}H_{25}Cl$); dodecylpyridinium bromide ($C_5H_5NC_{12}H_{25}Br$); hexadecylpyridinium chloride ($C_5H_5NC_{16}H_{33}Cl$); hexadecylpyridinium bromide ($C_5H_5NC_{16}H_{33}Br$); and mixtures thereof.

Representative N-Alkyl Halides

n=at least 10, and preferably 10–20,
M=a halogen atom (Cl, F, Br, I, At).

Representative Alkyl-Substituted Lactones

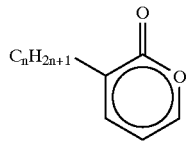

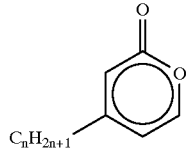

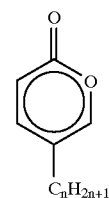

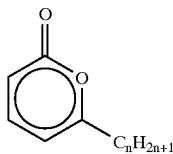

n=at least 10, preferably 10–20.

Representative Esters

Other useful, representative esters include methyl stearate; ethyl stearate; butyl stearate; dodecyl stearate; hexadecyl stearate; dimethyl maleate; dimethyl oxalate; dimethyl adipate; diethyl adipate; di(2- ethylhexyl) adipate; methyl salicylate; ethyl salicylate; methyl anthranilate; benzyl cinnamate; and mixtures thereof.

Representative Carboxylic Esters

Plasticizers
  Isodecyl adipate;
  Epoxidized esters;
  Sebacic acid esters, such as dibutyl sebacate;
  Stearic acid esters, such as isobutyl stearate.
Surface-Active Agents
  Carboxylic acid esters; and anhydrosorbitol esters, such as anhydrosorbitol monolaurate; anhydrosorbitol monooleate; and anhydrosorbitol monostearate.
  Ethylene glycol esters, such as ethylene glycol monolaurate.
  Ethoxylated anhydrosorbitol esters, such as ethoxylated anhydrosorbitol monolaurate; ethoxylated anhydrosorbitol monooleate; ethoxylated anhydrosorbitol monostearate; ethoxylated anhydrosorbitol tristearate; ethylene glycol distearate; and ethylene glycol monostearate.
  Glycerol esters, such as glycerol dilaurate; glycerol monooleate; and glycerol monostearate.
  Ethoxylated natural fats and oils, such as ethoxylated castor oil, ethoxylated hydrogenated castor oil; and ethoxylated lanolin.
  Poly(ethylene glycol) esters, such as poly(ethylene glycol) diester of tall oil acids; poly(ethylene glycol) dilaurate); poly(ethylene glycol) distearate); poly(ethylene glycol monolaurate); poly(ethylene glycol monopalmitate); poly(ethylene glycol monostearate); poly(ethylene glycol) sesquiester of tall oil acids; poly(glycerol monooleate); poly(glycerol monostearate); and 1,2-propanediol monostearate.
Miscellaneous Esters
  Fatty acid esters, not included with plasticizers or surface-active agents include methyl esters of tallow; and myristyl myristate.
  Polyhydric alcohol esters, such as 2-(2-butoxyethoxy) ethyl acetate; 2butoxyethyl acetate; and glycerides, mixed $C_{14\text{-}18}$ and $C_{16\text{-}18}$, mono- and di-.
  Ethers suitable as the intercalant monomer and/or as the polar organic carrier (Matrix Monomer) containing dispersed, individual silicate platelets, containing dispersed, individual silicate platelets, in accordance with the present invention, are compounds of the general formula Ar—O—R, and R—O—R' where Ar is an aryl group and R is an alkyl group having at least 10 carbon atoms.
  In accordance with another embodiment of the present invention, the intercalates can be exfoliated and dispersed into one or more melt-processible thermoplastic and/or thermosetting matrix oligomers or polymers, or mixtures thereof. Matrix polymers for use in this embodiment of the process of this invention may vary widely, the only requirement is that they are melt processible. In this embodiment of the invention, the polymer includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12grams per 10 minutes at the processing temperature.

Thermoplastic resins and rubbers for use as matrix polymers in the practice of this invention may vary widely. Illustrative of useful thermoplastic resins, which may be used alone or in admixture, are polyactones such as poly (pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly (ethylene adipate), poly(1,4-butylene adipate), poly (ethylene succinate), poly(2,3-butylene succinate), polyether diols and the like; polycarbonates such as poly [methane bis(4-phenyl) carbonate], poly[1,1-ether bis(4-phenyl) carbonate], poly[diphenylmethane bis(4-phenyl) carbonate], poly[1,1-cyclohexane bis(4-phenyl)carbonate] and the like; polysulfones; polyethers; polyketones; polyamides such as poly(4-amino butyric acid), poly (hexamethylene adipamide), poly(6-aminohexanoic acid), poly(m-xylylene adipamide), poly(p-xylylene sebacamide), poly(2,2,2-trimethyl hexamethylene terephthalamide), poly (metaphenylene isophthalamide) (NOMEX), poly(p-phenylene terephthalamide) (KEVLAR), and the like; polyesters such as poly(ethylene azelate), poly(ethylene-1,5-naphthalate, poly(1,4-cyclohexane dimethylene terephthalate), poly(ethylene oxybenzoate) (A-TELL), poly (parahydroxy benzoate) (EKONOL), poly(1,4-cyclohexylidene dimethylene terephthalate) (KODEL) (cis), poly(1,4-cyclohexylidene dimethylene terephthalate) (Kodel) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, poly-acrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

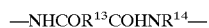

—NHCOR$^{13}$COHNR$^{14}$— in which R$^{13}$ is an alkylene group of at least 2 carbon atoms, preferably from about 2 to about 11, or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6,10), poly(hexamethylene isophthalamide), poly(hexamethylene terephthalamide), poly(heptamethylene pimelamide) (nylon 7,7), poly(octamethylene suberamide) (nylon 8,8), poly(nonamethylene azelamide) (nylon 9,9) poly(decamethylene azelamide) (nylon 10,9), poly(decamethylene sebacamide) (nylon 10,10), poly[bis(4-amino cyclohexyl)methane-1,10-decanecarboxamide)], poly(m-xylylene adipamide), poly(p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use as a matrix polymer are poly(caprolactam), poly(12-aminododecanoic acid) and poly(hexamethylene adipamide).

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly(ethylene terephthalate), poly(cyclohexlenedimethylene terephthalate), poly(ethylene dodecate), poly(butylene terephthalate), poly[ethylene(2,7-naphthalate)], poly(methaphenylene isophthalate), poly(glycolic acid), poly(ethylene succinate), poly(ethylene adipate), poly(ethylene sebacate), poly(decamethylene azelate), poly(decamethylene adipate), poly(decamethylene sebacate), poly(dimethylpropiolactone), poly(parahydroxybenzoate) (EKONOL), poly(ethylene oxybenzoate) (A-tell), poly(ethylene isophthalate), poly(tetramethylene terephthalate), poly(hexamethylene terephthalate), poly(decamethylene terephthalate), poly(1,4-cyclohexane dimethylene terephthalate) (trans), poly(ethylene 1,5-naphthalate), poly(ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and a o-phthalic acid, 1,3-naphthalenedicarboxylic acid, 1,4-naphthalenedicarboxylic acid, 2,6-naphthalenedicarboxylic acid, 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred matrix polymer for incorporation with exfoliates manufactured in accordance with the present invention is a polymer selected from the group consisting of poly(ethylene terephthalate), poly(butylene terephthalate), poly(1,4-cyclohexane dimethylene terephthalate), a polyvinylimine, and mixtures thereof. Among these polyesters of choice, poly(ethylene terephthalate) and poly(butylene terephthalate) are most preferred.

Still other useful thermoplastic homopolymers and copolymer matrix polymers for forming nanocomposites with the exfoliates of the present invention are polymers formed by polymerization of alpha-beta-unsaturated monomers or the formula:

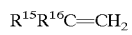

$$R^{15}R^{16}C=CH_2$$

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly(ethylene) and ethylene copolymers. More preferred are poly(ethylene) and poly(propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated and/or exfoliated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a master gel, e.g, having about 10–90%, preferably about 20–80% intercalate and/or exfoliated platelets of layered material and about 10–90%, preferably about 20–80% carrier/solvent. The master gel can be later diluted and mixed with additional carrier or solvent to reduce the viscosity of the composition to a desired level.

The intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

In accordance with an important feature of the present invention, a wide variety of topically-active compounds can be incorporated into a stable composition of the present invention. Such topically active compositions include cosmetic, industrial, and medicinal compounds that act upon contact with the skin or hair, or are used to adjust rheology of industrial greases and the like. In accordance with another important feature of the present invention, a topically-active compound can be solubilized in the composition of the present invention or can be homogeneously dispersed throughout the composition as an insoluble, particulate material. In either case topically-effective compositions of the present invention are resistant to composition separation and effectively apply the topically-active compound to the skin or hair. If required for stability, a surfactant can be included in the composition, such as any disclosed in Laughlin, et al. U.S. Pat. No. 3,929,678, hereby incorporated by reference. In general, the topically-effective compositions of the present invention demonstrate essentially no phase separation if the topically-active compound is solubilized in the compositions. Furthermore, if the topically-active compound is insoluble in the composition, the composition demonstrates essentially no phase separation.

The topically-active compounds can be a cosmetically-active compound, a medically-active compound or any other compound that is useful upon application to the skin or hair. Such topically-active compounds include, for example, antiperspirants, antidandruff agents, antibacterial compounds, antifungal compounds, anti-inflammatory compounds, topical anesthetics, sunscreens and other cosmetic and medical topically-effective compounds.

Therefore, in accordance with an important feature of the present invention, the stable topically-effective composition can include any of the generally-known antiperspirant compounds such as finely-divided solid astringent salts, for example, aluminum chlorohydrate, aluminum chlorohydrox, zirconium chlorohydrate, and complexes of aluminum chlorohydrate with zirconyl chloride or zirconyl hydroxychloride. In general, the amount of the antiperspirant compound, such as aluminum zirconium tetrachlorohydrex glycine in the composition can range from about 0.01% to about 50%, and preferably from about 0.1% to about 30%, by weight of the total composition.

Other topically-active compounds can be included in the compositions of the present invention in an amount sufficient to perform their intended function. For example, zinc oxide, titanium dioxide or similar compounds can be included if the composition is intended to be a sunscreen. Similarly, topically-active drugs, like antifungal compounds; antibacterial compounds; anti-inflammatory compounds; topical anesthetics; skin rash, skin disease and dermatitis medications; and anti-itch and irritation-reducing compounds can be included in the compositions of the present invention. For example, analgesics such as benzocaine, dyclonine hydrochloride, aloe vera and the like; anesthetics such as butamben picrate, lidocaine hydrochloride, zylocaine and the like; antibacterials and antiseptics, such as povidone-iodine, polymyxin b sulfate-bacitracin, zinc-neomycin sulfate-hydrocortisone, chloramphenicol, methylbenzethonium chloride, and erythromycin and the like; antiparasitics, such as lindane; deodorants, such as chlorophyllin copper complex, aluminum chloride, aluminum chloride hexahydrate, and methylbenzethonium chloride; essentially all dermatologicals, like acne preparations, such as benzoyl peroxide, erythromycin-benzoyl peroxide, clindamycin phosphate, 5,7-dichloro-8-hydroxyquinoline, and the like; anti-inflammatory agents, such as alclometasone dipropionate, betamethasone valerate, and the like; burn relief ointments, such as o-amino-p-toluenesulfonamide monoacetate and the like; depigmenting agents, such as monobenzone; dermatitis relief agents, such as the active steroids amcinonide, diflorasone diacetate, hydrocortisone, and the like; diaper rash relief agents, such as methylbenzethonium chloride and the like; emollients and moisturizers, such as mineral oil, PEG-4 dilaurate, lanolin oil, petrolatum, mineral wax and the like; fungicides, such as butocouazole nitrate, haloprogin, clotrimazole, and the like; herpes treatment drugs, such as 9-[(2-hydroxyethoxy)methyl]guanine; pruritic medications, such as alclometasone dipropionate, betamethasone valerate, isopropyl myristate MSD, and the like; psoriasis, seborrhea and scabicide agents, such as anthralin, methoxsalen, coal tar and the like; sunscreens, such as octyl p-(dimethylamino)benzoate, octyl methoxycinnamate, oxybenzone and the like; steroids, such as 2-(acetyloxy)-9-fluoro-1',2',3',4'-tetrahydro-11-hydroxypregna-1,4-dieno [16,17-b] naphthalene-3,20-dione, and 21-chloro-9-fluoro-1',2',3',4'-tetrahydro-11b-hydroxypregna-1,4-dieno[16z,17-b]naphthalene-3,20-dione. Any other medication capable of topical administration also can be incorporated in composition of the present invention in an amount sufficient to perform its intended function.

Eventual exfoliation of the intercalated layered material should provide delamination of at least about 90% by weight of the intercalated material to provide a more viscous composition comprising a carrier or solvent having monomer-complexed platelet particles substantially homogeneously dispersed therein. Some intercalates require a shear rate that is greater than about 10 sec$^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant monomer at one end of an extruder (single or double screw) and receiving the sheared material at the other end of the extruder. The temperature of the layered material/intercalant monomer composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

Exfoliation should be sufficiently thorough to provide at least about 80% by weight, preferably at least about 85% by weight, more preferably at least about 90% by weight, and most preferably at least about 95% by weight delamination of the layers to form two monomer layer tactoids that include three platelets or, more preferably, individual platelet particles that can be substantially homogeneously dispersed in the carrier or solvent. As formed by this process, the platelet particles or platelet multi-layer tactoids dispersed in the carrier or solvent have the thickness of the individual layers plus one to five monolayer thicknesses of complexed monomer, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all individual layers delaminate one from the other to form separate platelet particles for admixture with the carrier or solvent. The compositions can include the layered material as all intercalate, completely without exfoliation, initially to provide relatively low viscosities for transportation and pumping until it is desired to increase viscosity via easy exfoliation. In cases where intercalation is incomplete between some layers, those layers will not delaminate in the carrier or solvent, and will form platelet particles comprising those layers in a coplanar aggregate.

The effect of adding into a polar organic liquid carrier the nanoscale particulate dispersed platelet particles, derived from the intercalates formed in accordance with the present invention, typically is an increase in viscosity.

Molding compositions comprising a thermoplastic or thermosetting polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional methods, for example by lacquering or by the application of protective films.

Matrix polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles, exfoliated in accordance with the present invention, and matrix polymer that form the nanocomposites of one embodiment of the present invention are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specific examples are presented to more particularly illustrate the invention and are not to be construed as limitations thereon.

The graphs of FIGS. 5–11 are x-ray diffraction patterns of blends of various amounts of dodecyl pyrrolidone monomer intercalant with sodium bentonite clay (containing a crystobalite impurity). The d(001) peak of non-exfoliated (layered) sodium bentonite clay appears at about 12.5 Å, as shown in the mechanical blends of powdered sodium bentonite clay (containing about 10–12% by weight water) with powdered monomer intercalants, at various monomer intercalant loadings. When the mechanical blends were then heated to the intercalant monomer melt temperature, and preferably at least about 40–50° C. above the intercalant monomer melt temperature for faster reaction, the monomer melt was intercalated between the bentonite clay platelets, and an exothermic reaction occurred that, it is theorized, resulted from the intercalant monomer being bonded to the internal faces of the clay platelets sufficiently for exfoliation of the intercalated clay. It should be noted, also, that intercalation did not occur unless the bentonite clay included water in an amount of at least about 5% by weight, based on the dry weight of the clay, preferably at least about 10% to about 15% water. The water can be included in the clay as received, or can be added to the clay prior to or during intercalant monomer melt or solution contact.

Figure 5:
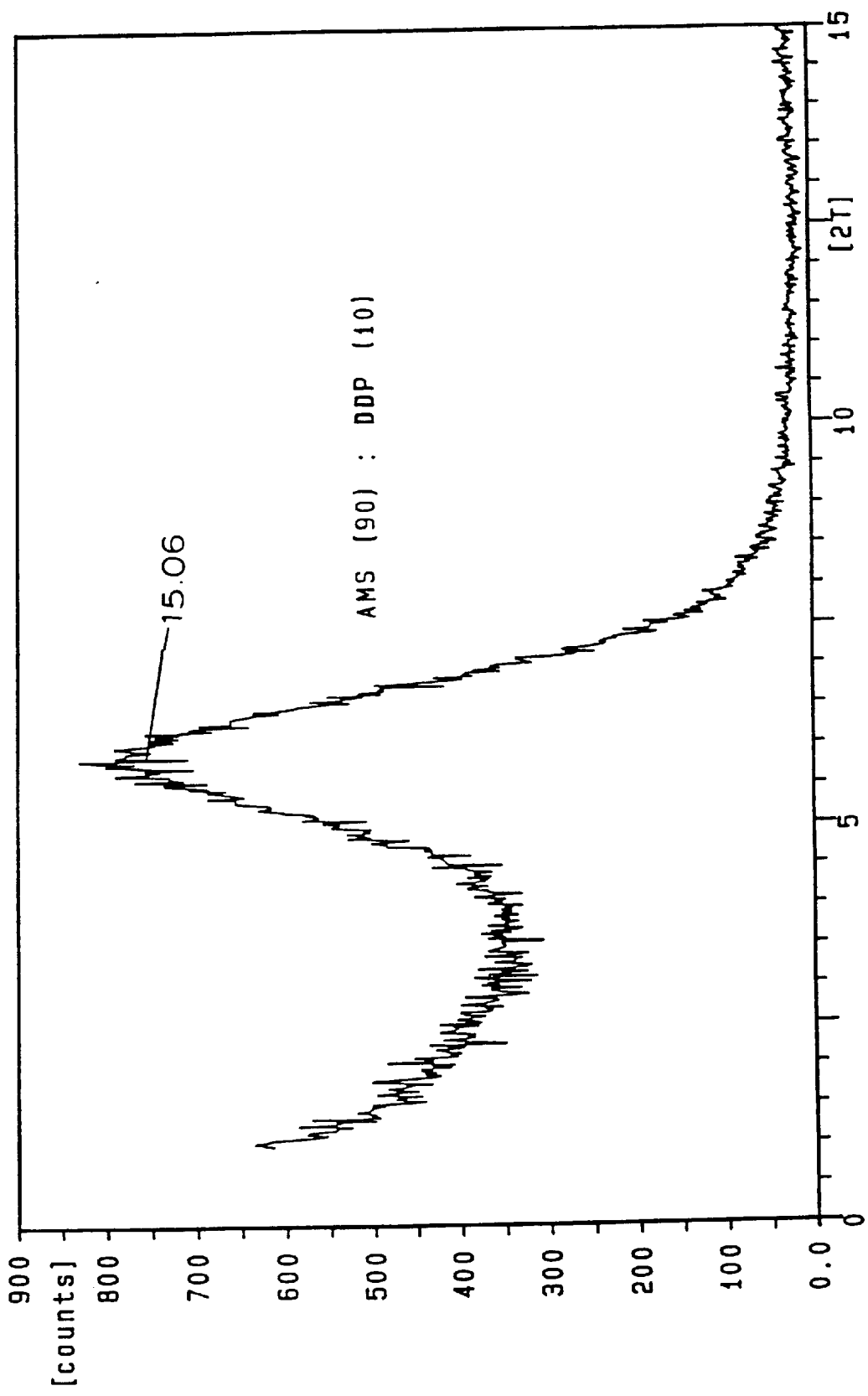
FIG. 5 is an x-ray diffraction pattern for a complex of 10% by weight of dodecyl pyrrolidone and 90% by weight sodium montmorillonite clay.

As shown in FIG. 5, the melted blend of 10% dodecyl pyrrolidone, 90% sodium montmorillonite clay does not include a d(001) peak at about 12.5 Å (the layered clay was no longer present in the blend), but shows a d(020) peak at about 15 Å that is representative of intercalation. It should also be noted that the intercalation occurred without shearing—the layered clay intercalates naturally after sufficient exposure to intercalant monomer.

Figure 6:
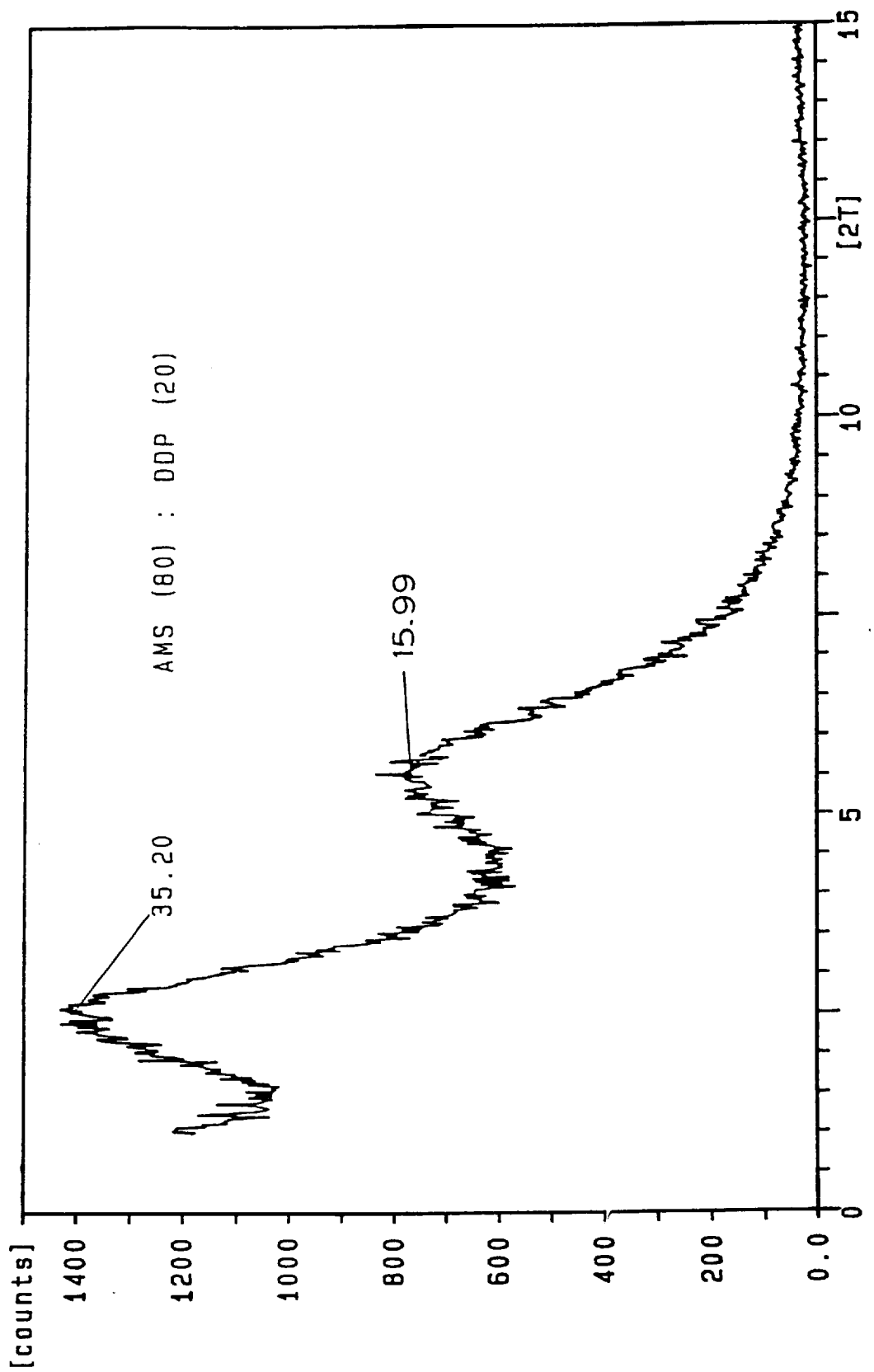
FIG. 6 is an x-ray diffraction pattern for a complex of 20% by weight of dodecyl pyrrolidone and 80% by weight sodium montmorillonite clay.
Figure 7:
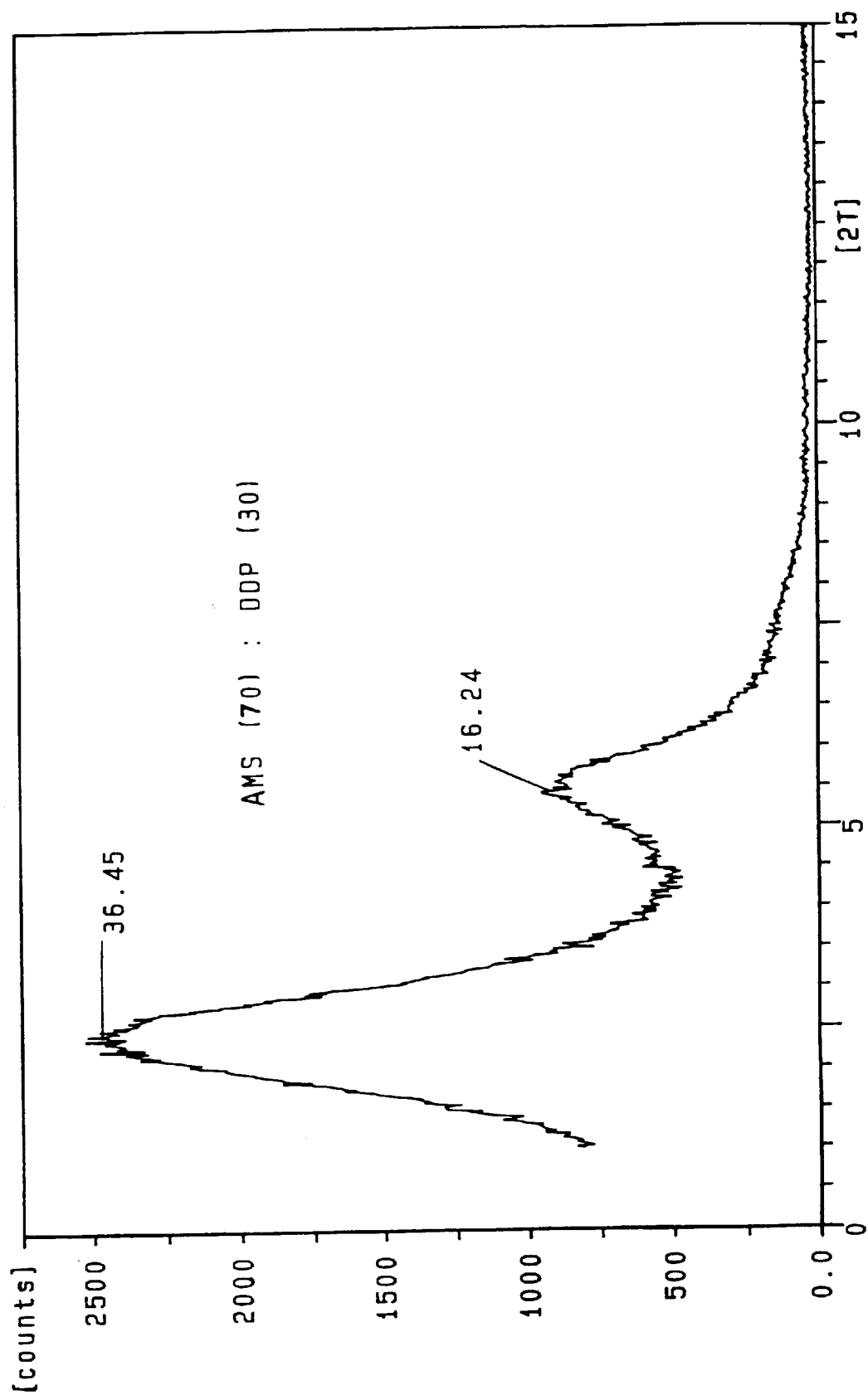
FIG. 7 is an x-ray diffraction pattern for a complex of 30% by weight of dodecyl pyrrolidone and 70% by weight sodium montmorillonite clay.
Figure 8:
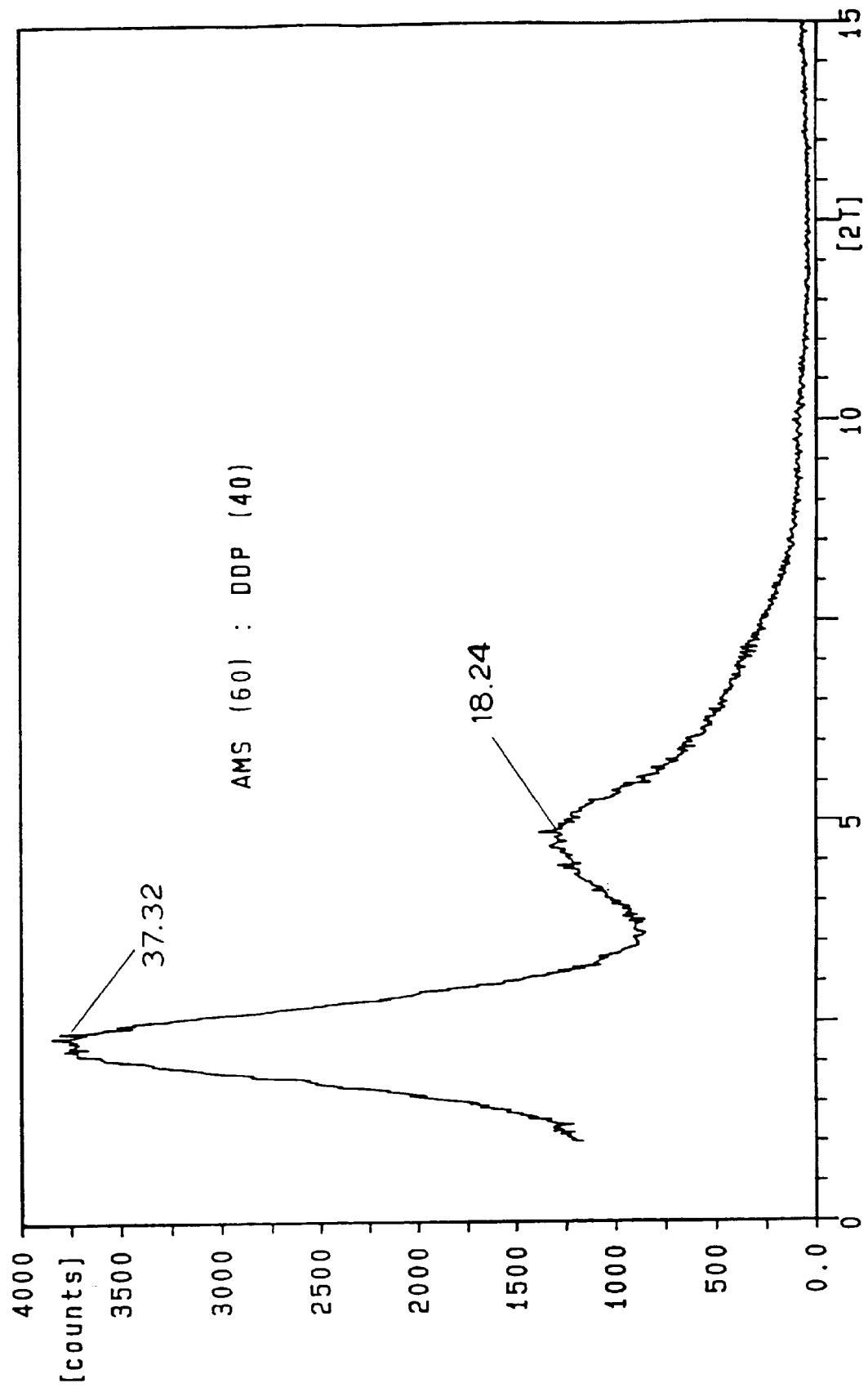
FIG. 8 is an x-ray diffraction pattern for a complex of 40% by weight of dodecyl pyrrolidone and 60% by weight sodium montmorillonite clay.
Figure 9:
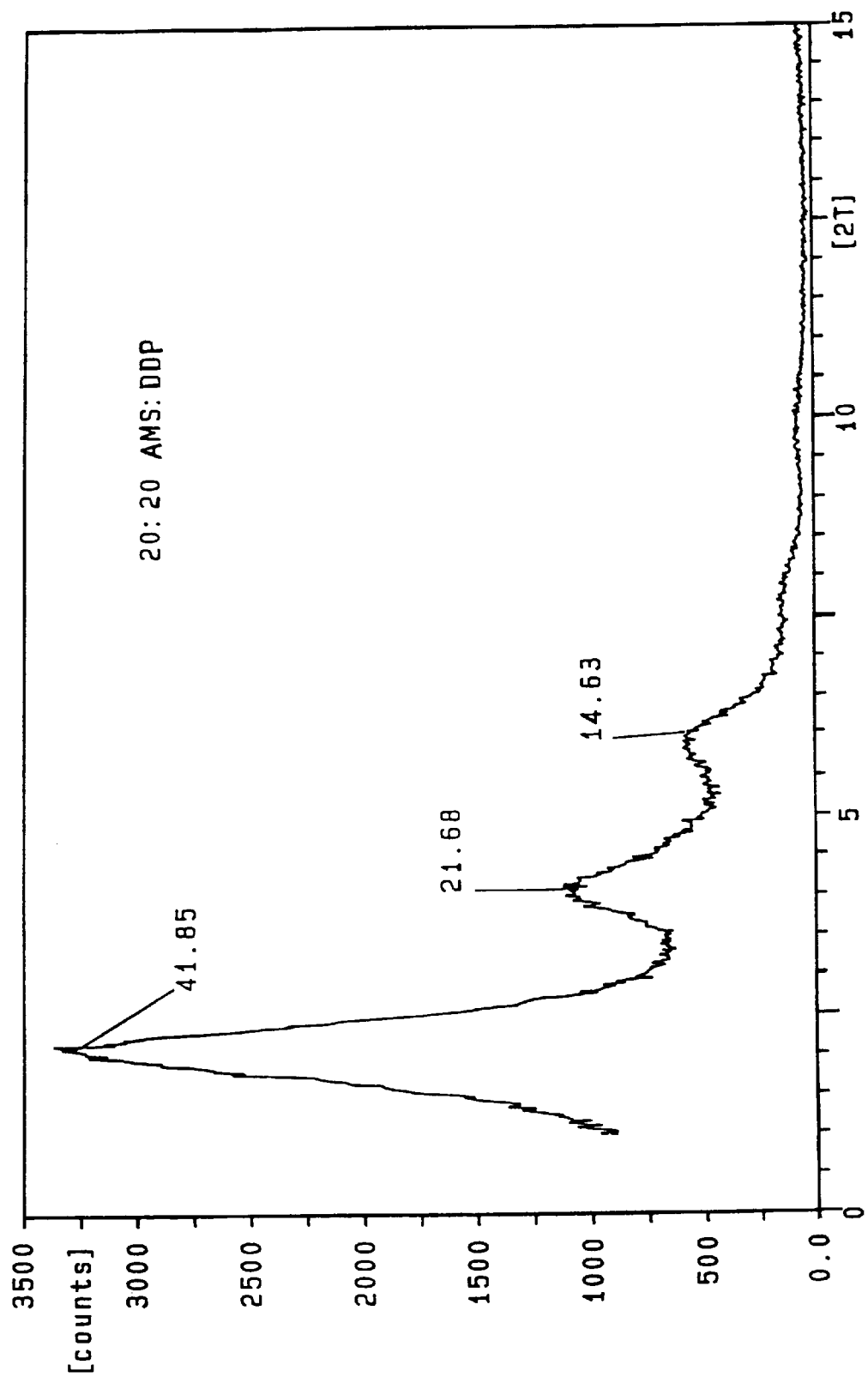
FIG. 9 is an x-ray diffraction pattern for a complex of 50% by weight of dodecyl pyrrolidone and 50% by weight sodium montmorillonite clay.
Figure 10:
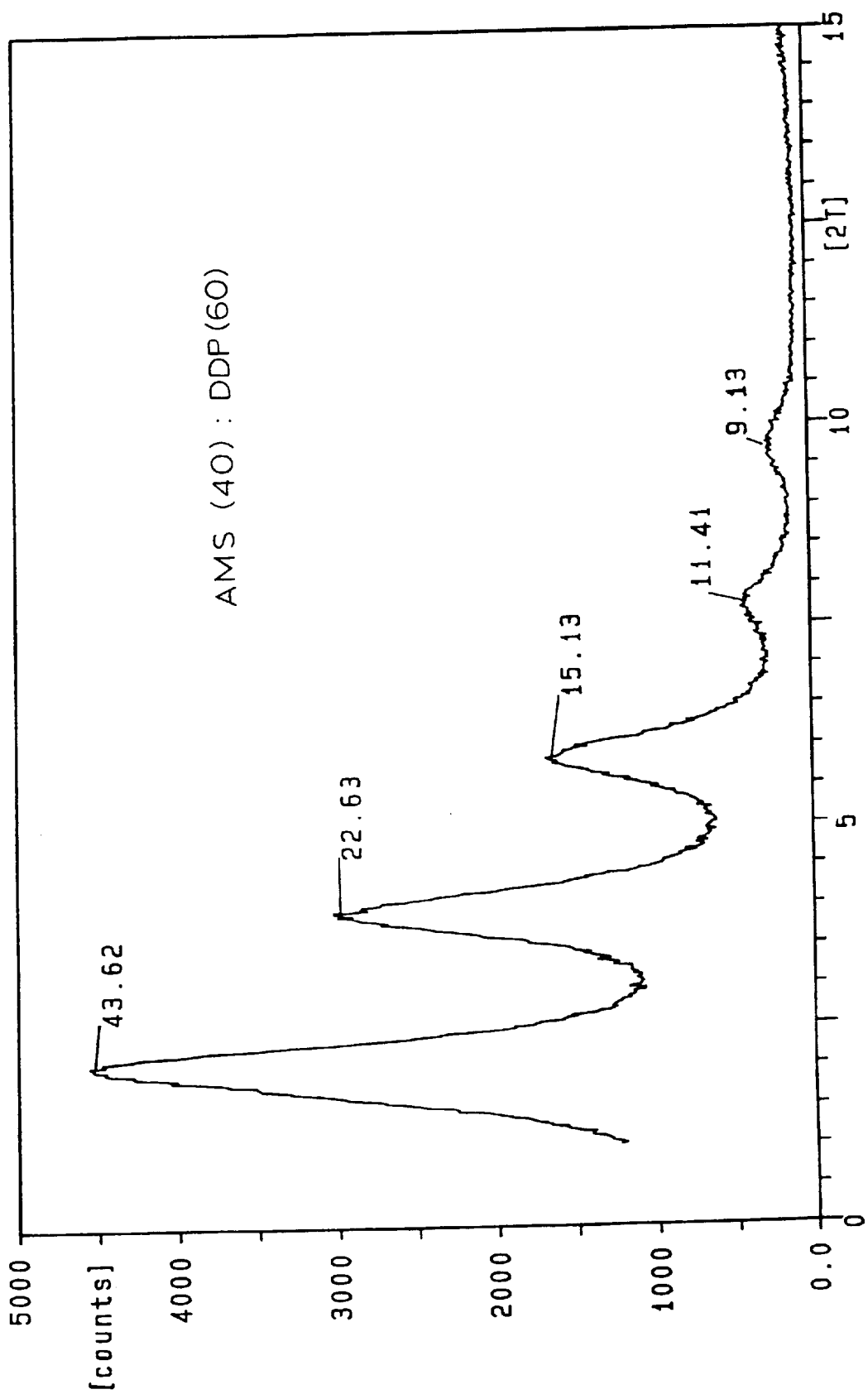
FIG. 10 is an x-ray diffraction pattern for a complex of 60% by weight of dodecyl pyrrolidone and 40% by weight sodium montmorillonite clay.
Figure 11:
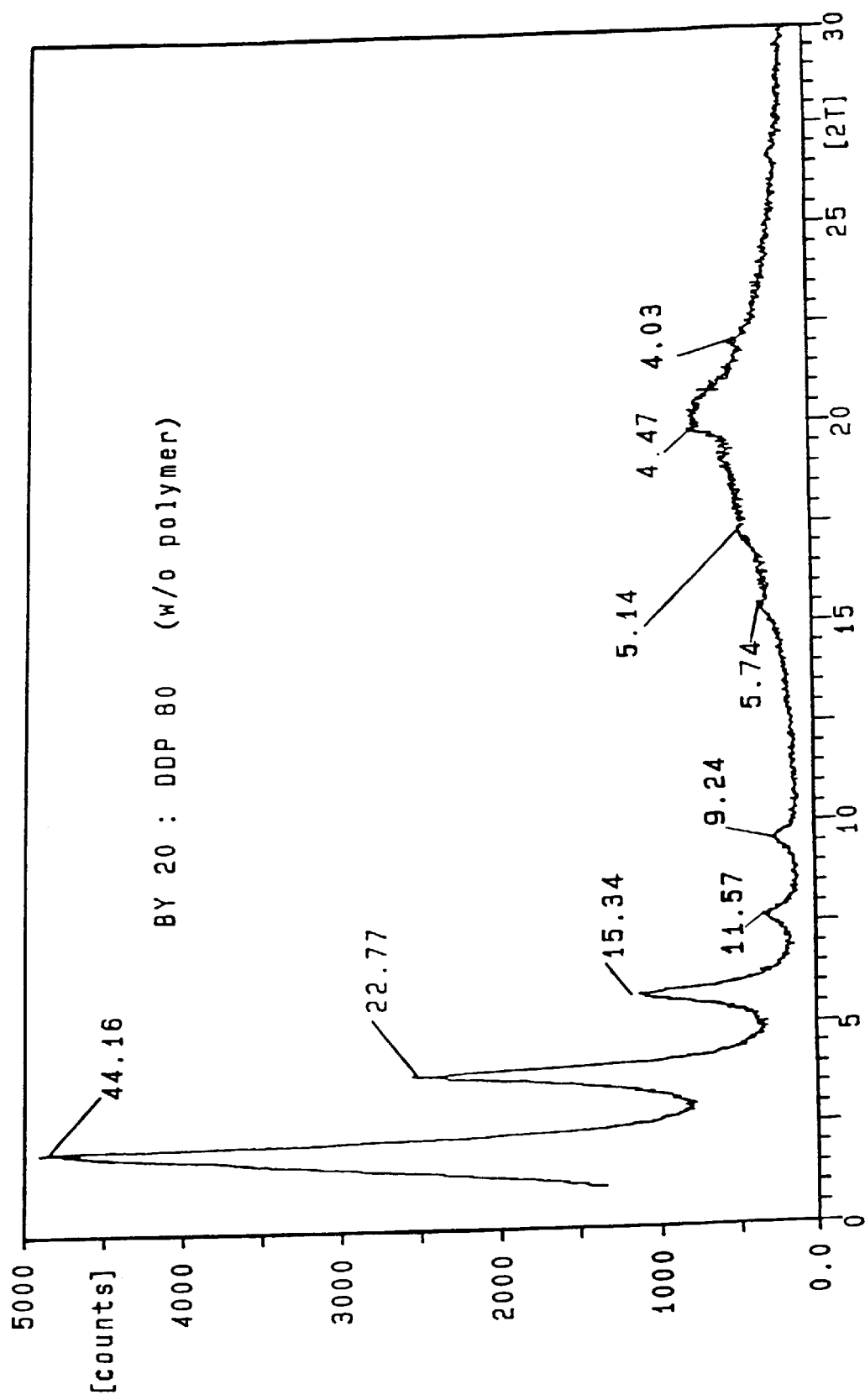
FIG. 11 is an x-ray diffraction pattern for a complex of 80% by weight of dodecyl pyrrolidone and 20% by weight sodium montmorillonite clay.
Figure 12:
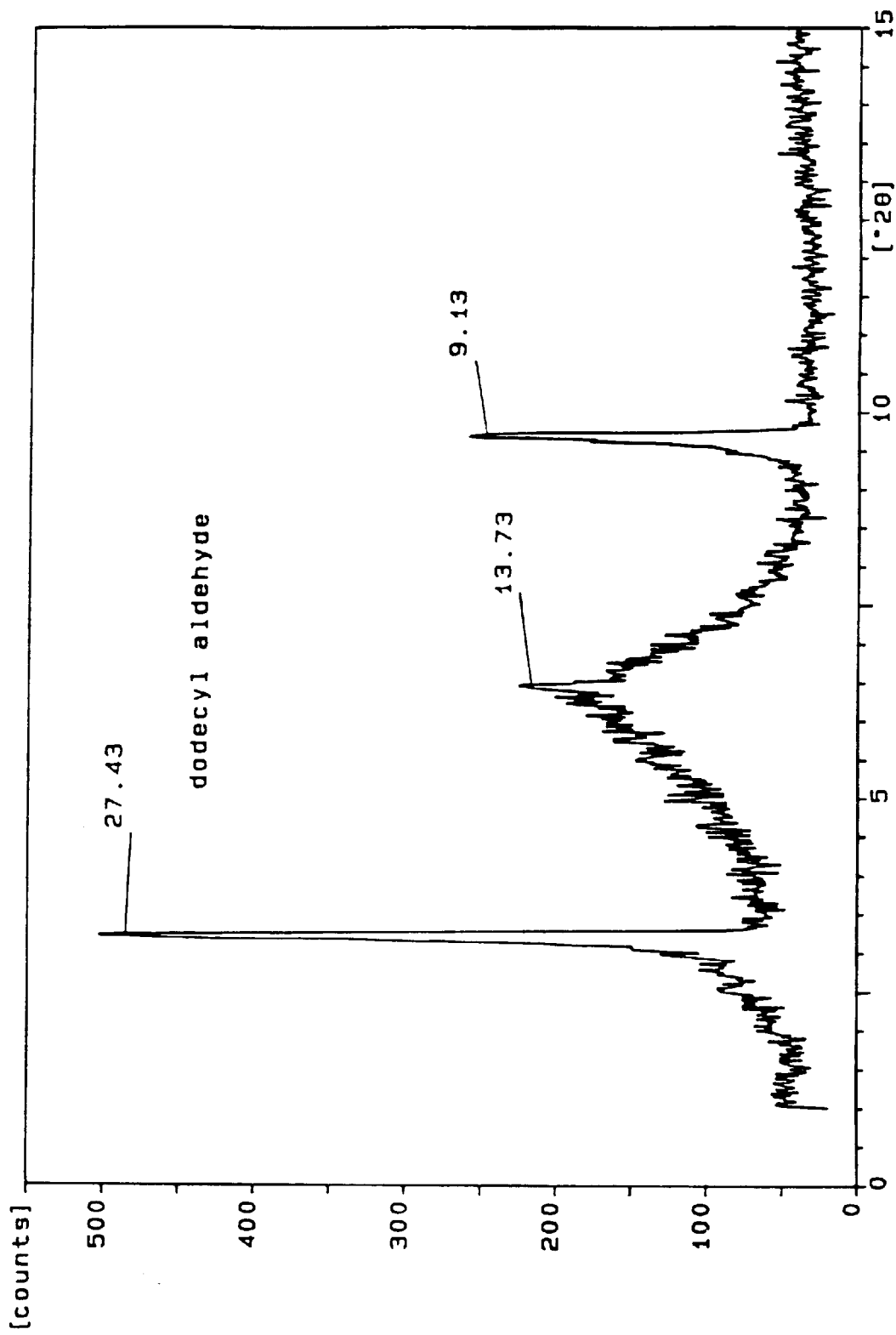
FIG. 12 is an x-ray diffraction pattern for a complex of 30% dodecyl aldehyde and 70% sodium montmorillonite clay.

FIG. 6 is an x-ray diffraction pattern for a melted blend (complex) of dodecyl pyrrolidone (DDP) and sodium montmorillonite clay at 20% by weight DDP and 80% by weight sodium montmorillonite or approximately a 1:1 molar ratio of DDP and sodium. It should be noted that at or above the 1:1 molar ratio of DDP to sodium (on the inner platelet surfaces of the sodium montmorillonite clay) a strong peak occurs at about 35 Å, with the peak at about 15 Å (e.g., 15.99 Å) becoming less significant. As the molar ratio of DDP to sodium is increased (FIGS. 7–11), the peak at about 35 Å moves slightly higher (up to about 44 Å) and becomes stronger (as indicated by a more narrow peak), while the peak at about 15 Å becomes less and less significant. At a weight ratio of about 40% DDP and 60% sodium (FIG. 8) or a 2:1 molar ratio of DDP to sodium, a second order peak appears at about 18 Å, and the peak at 15 Å has disappeared. At this molar ratio of 2:1 there are two DDP molecules surrounding each montmorillonite inner platelet sodium ion to provide two long chain ($C_{12}$) rigid tails extending perpendicularly from the inner sodium montmorillonite platelet surfaces. At 50% by weight DDP, 50% sodium montmorillonite (FIG. 9) a third order peak appears at about 14.6 Å signifying that a third DDP molecule has coordinated surrounding each sodium ion on the platelet surfaces of the sodium montmorillonite clay, thereby providing three orders of diffraction for the intercalated clay. As more DDP molecules coordinate to surround the $Na^+$ ions on the inner platelet surfaces of the sodium montmorillonite clay, the perpendicularly extending long chain ($C_{12}$) tails become more and more rigid, and some of the $C_{12}$ tails abut $C_{12}$ tail ends of DDP molecules extending perpendicularly from $Na^+$ ions on an adjacent sodium montmorillonite platelet surface. The abutting rigid tail ends of the $C_{12}$ radical of the DDP molecules provide surprising separation of adjacent sodium montmorillonite platelets at relatively low loadings of DDP and other long chain alkyl ($C_{10}+$ alkyl) organic molecules that include a molecule end having a dipole moment greater than the dipole moment of water. As shown in FIGS. 10 and 11, at 60% and 80% by weight DDP, fifth and higher orders of diffraction occur, indicating more DDP molecules surrounding the $Na^+$ ions on the inner platelet surfaces of the sodium montmorillonite clay. FIG. 12 shows the same type of intercalation using dodecyl aldehyde as the monomer intercalant. Similar results also are achieved with stearic acid and other $C_{10}+$ alkyl organic monomers having a dipole moment at one molecule end that is greater than the dipole moment of water.

Since wide basal spacings can be achieved using relatively few intercalant molecules, due to the rigidity of the extending long chain alkyl tails of the intercalant molecules; and due to the abutment of some of the long chain alkyl tails extending in opposite directions from cations of adjacent montmorillonite platelets, the gallery of intercalant molecules extending from the surfaces of the intercalate and exfoliate platelets can be relatively sparse and untangled, resulting in exceptional sorption (absorption and/or adsorption) of both hydrophilic and hydrophobic liquids and gases. Monomer intercalants having an alkyl radical with less than about 10 carbon atoms require far more monomer to achieve similar basal spacings and, therefore, are capable of sorbing for less liquid and gas molecules.

EXAMPLE 2

An intercalate, formed as in the previous example between dodecyl pyrrolidone (DDP) and sodium montmorillonite clay at a 2:1 weight ratio, was compounded into polybutylene terephthalate (PBT) polymer at 30 percent by weight of the intercalate, 70 weight percent PBT. This concentrate was then further compounded into PBT to yield a final nanocomposite with 6.3% by weight DDP-complexed clay platelets (the nanocomposite).

The following table contains a comparison of the physical properties of pure PBT and its composite.

| | Data for PBT Composities Containing AMS*-DDP | | | | | | | |
|---|---|---|---|---|---|---|---|---|
| | INSTRON | | | | | | | DMA |
| Sample Description | Maximum Load (MPa) | Maximum Strain (%) | Modulus (MPa) | Modulus (MPa) (75° C.) (above Tg) | Impact St. (J/m) | Energy to Break (kgf-mm) | HDT HDT° C. 66 psi 264 psi | Flexural Modulus at 23° C. (MPa) |
| 6.3% AMS (DDP)/PBT | 55.4 | 2.65 | 3083.8 | 1000 | 21.4 | 397.2 | 91 | 3056.9 |
| Pure PBT | 50.5 | >58.2 | 2324 | 500 | 56.0 | 9551.7 | 54.0 | 2139.3 |

*AMS = sodium montmorillonite clay

Figure 13:
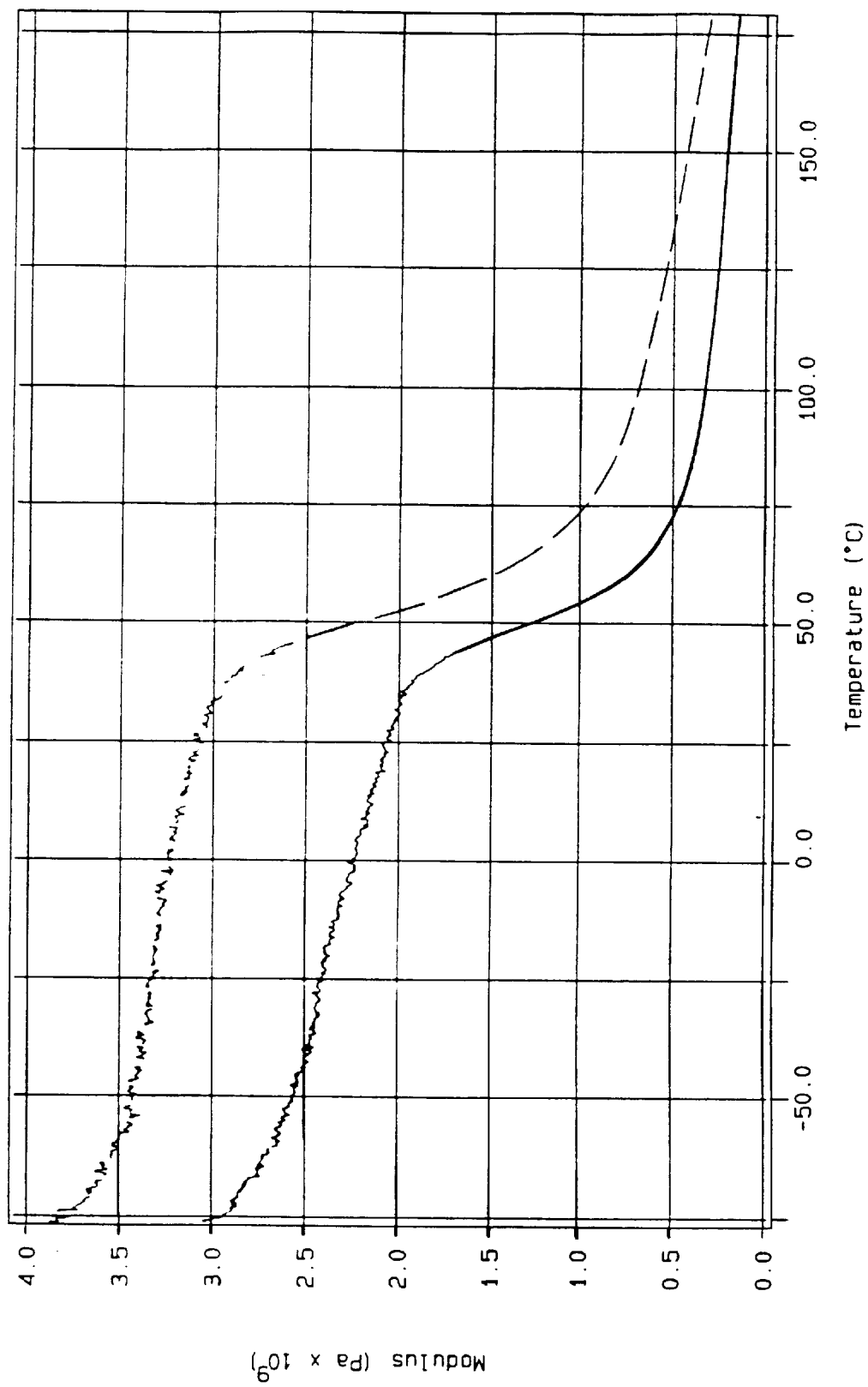
FIG. 13 is a graph showing flexural modulus versus temperature for the dodecyl pyrrolidone (DDP) complex of Example 2 added to a polybutylene terephthalate matrix polymer.

The composite has substantially better tensile strength, modulas, and heat distortion temperature (HDT). FIG. 13 compares the dynamic mechanical analyses (DMA) of the flexural modulus for pure PBT (lower curve) and the nanocomposite (upper curve).

At a temperature below the glass transition temperature (Tg) of the PBT matrix polymer, e.g., 25° C., the clay platelet—DDP complex increases the flexural modulus increases from about $2.1 \times 10^9$ Pa to about $3.1 \times 10^9$ Pa or about 48%. Surprisingly, at a temperature above the glass transition temperature of the PBT matrix polymer, e.g., 75° C., the flexural modulus increases from about $0.45 \times 10^9$ Pa to about $0.95 \times 10^9$ Pa, or about a 100% increase in flexural modulus.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the process may be varied substantially without departing from the spirit of the invention, and the exclusive use of all modifications which come within the scope of the appended claims is reserved.

What is claimed is:

1. An intercalate, capable of being exfoliated, formed by contacting a phyllosilicate, having a moisture content of at least about 4% by weight, with an intercalant monomer having an alkyl radical of at least 10 carbon atoms in length and having a polar moiety at one end that has a dipole moment greater than the dipole moment of water, to form an intercalating composition, said intercalating composition having a weight ratio of intercalant monomer to phyllosilicate of at least about 1:20, to achieve sorption and complexing of the intercalant monomer, thereby forming said intercalate, through a mechanism selected from the group consisting of ionic complexing; electrostatic complexing; chelation; hydrogen bonding; ion-dipole; dipole/dipole; Van Der Waals forces; and any combination thereof, between adjacent spaced layers of the phyllosilicate without an onium ion or silane coupling agent to expand the spacing between a predominance of the adjacent platelets of said phyllosilicate to at least about 5 Å, when measured after sorption of intercalant monomer and drying to a maximum of 5% by weight water.

2. An intercalate in accordance with claim 1, wherein the concentration of intercalant monomer in said intercalating composition is at least about 0.1% by weight, based on the weight of water and intercalant monomer in the intercalating composition.

3. An intercalate in accordance with claim 2, wherein the concentration of intercalant monomer in said intercalating composition is at least about 1% by weight.

4. An intercalate in accordance with claim 3, wherein the concentration of intercalant monomer in said intercalating composition is at least about 2% by weight.

5. An intercalate in accordance with claim 4, wherein the concentration of intercalant monomer in said intercalating composition is at least about 30% by weight.

6. An intercalate in accordance with claim 4, wherein the concentration of intercalant monomer in said intercalating composition is in the range of about 10% to about 60% by weight.

7. An intercalate in accordance with claim 5, wherein the concentration of intercalant monomer in said intercalating composition in the range of about 50% to about 90% by weight.

8. An intercalate in accordance with claim 1, wherein the concentration of intercalant monomer in the intercalating composition is at least about 16% by weight, based on the dry weight of the layered material contacted.

9. An intercalate in accordance with claim 8, wherein the concentration of intercalant monomer in the intercalating composition is in the range of about 16% to about 70% by weight, based on the dry weight of the layered material contacted.

10. An intercalate in accordance with claim 9, wherein the concentration of intercalant monomer in the intercalating composition is in the range of about 16% to less than about 35% by weight, based on the dry weight of the layered material contacted.

11. An intercalate in accordance with claim 9, wherein the concentration of intercalant monomer in the intercalating composition is in the range of about 35% to less than about 55% by weight, based on the dry weight of the layered material contacted.

12. An intercalate in accordance with claim 9, wherein the concentration of the intercalant monomer in the intercalating composition is in the range of about 55% to less than about 70% by weight, based on the dry weight of the layered material contacted.

13. An intercalate in accordance with claim 1, wherein the intercalant monomer is an alcohol having an alkyl radical of 10 to 24 carbon atoms.

14. An intercalate in accordance with claim 1, wherein the intercalant monomer is selected from alcohols and polyhydric alcohols.

15. A method of exfoliating a phyllosilicate comprising: contacting the phyllosilicate, having a moisture content of at least about 4% by weight, with an intercalant monomer having an alkyl radical of at least 10 carbon atoms in length and having a polar moiety at one end that has a dipole moment greater than the dipole moment of water, to form an intercalating composition comprising at least about 2% by weight of said intercalant monomer, to achieve intercalation of said monomer between said adjacent phyllosilicate platelets, without an onium ion or silane coupling agent, in an amount sufficient to space said adjacent phyllosilicate platelets a distance of at least about 5 Å; and separating the platelets of the intercalated phyllosilicate.

16. The method of claim 15, wherein said intercalating composition includes a water carrier comprising about 5% to about 50% by weight water, based on the total weight of said intercalating composition.

17. The method of claim 16, wherein said intercalating composition comprises about 10% to about 40% by weight water.

18. A composition comprising an organic liquid carrier in an amount of about 40% to about 99.95% by weight of the composite material, and about 0.05% to about 60% by weight of an intercalated phyllosilicate material, said intercalated phyllosilicate material formed by contacting a phyllosilicate, having a water content of at least about 4% by weight, with an intercalant monomer having an alkyl radical of at least 10 carbon atoms in length and having a polar moiety at one end that has a dipole moment greater than the dipole moment of water, to form an intercalating composition, having a weight ratio of intercalant monomer-:phyllosilicate of at least about 1:20 to achieve sorption of the intercalant monomer between adjacent spaced layers of the phyllosilicate, without an onium ion or silane coupling agent, to expand the spacing between a predominance of the adjacent phyllosilicate platelets at least about 5 Å, when measured after sorption of the intercalant monomer and at a maximum water content of about 5% by weight, based on the dry weight of the phyllosilicate.

19. The composition of claim 18, wherein the intercalate is exfoliated into a predominance of individual platelets.

20. A composition in accordance with claim 18, wherein said intercalating composition comprises the phyllosilicate, an intercalant monomer and water, and wherein the concentration of intercalant monomer in said intercalating composition is at least about 4% by weight, based on the dry weight of the phyllosilicate in the intercalating composition.

21. A composition in accordance with claim 20, wherein the concentration of intercalant monomer in said intercalating composition is at least about 15% by weight, based on the dry weight of the phyllosilicate in the intercalating composition.

22. A composition in accordance with claim 21, wherein the concentration of intercalant monomer in said intercalating composition is at least about 20% by weight.

23. A composition in accordance with claim 22, wherein the concentration of intercalant monomer in said intercalating composition is at least about 30% by weight.

24. A composition in accordance with claim 23, wherein the concentration of intercalant monomer in said intercalating composition in the range of about 50% to about 80% by weight.

25. A composition in accordance with claim 23, wherein the concentration of intercalant monomer in said intercalating composition in the range of about 50% to about 100% by weight.

26. A composition in accordance with claim 18, wherein the concentration of intercalant monomer in the intercalating composition is at least about 16% by weight.

27. A composition in accordance with claim 26, wherein the concentration of intercalant monomer in the intercalating composition is in the range of about 16% to about 70% by weight.

28. A composition in accordance with claim 27, wherein the concentration of intercalant monomer in the intercalating composition is in the range of about 16% to less than about 35% by weight.

29. A composition in accordance with claim 27, wherein the concentration of intercalant monomer in the intercalating composition is in the range of about 35% to less than about 55% by weight.

30. A composition in accordance with claim 27, wherein the concentration of the intercalant monomer in the intercalating composition is in the range of about 55% to less than about 70% by weight.

31. A composition in accordance with claim 18, further including a matrix polymer selected from the group consisting of a polyamide; polyvinyl alcohol; polycarbonate; polyvinylimine; polyvinylpyrrolidone; polyethylene terephthalate; polybutylene terephthalate; a polymer polymerized from a monomer selected from the group consisting of dihydroxyethyl terephthalate; dihydroxybutyl terephthalate; hydroxyethylmethyl terephthalate; hydroxybutylmethyl terephthalate; and mixtures thereof.

32. A composition in accordance with claim 31, wherein the matrix polymer is a mixture of a polymer of hydroxyethyl terephthalate with a polymer polymerized from a monomer selected from the group consisting of dihydroxyethyl terephthalate and dihydroxybutyl terephthalate, and mixtures thereof.

33. A composition in accordance with claim 31, wherein the matrix polymer is polyethylene terephthalate.

34. A method of manufacturing a composite material containing about 10% to about 99.95% by weight of a matrix polymer selected from the group consisting of a thermoplastic polymer, a thermosetting polymer, and mixtures thereof, and about 0.05% to about 60% by weight of exfoliated platelets of a phyllosilicate material, said platelets derived from an intercalated phyllosilicate having an intercalant monomer intercalated between and bonded to an inner surface of the phyllosilicate platelets through a bonding mechanism selected from the group consisting of ionic complexing; electrostatic complexing; chelation; hydrogen bonding; ion-dipole; dipole/dipole; Van Der Waals forces; and any combination thereof, comprising:

contacting the phyllosilicate, having a moisture contact of about 4% by weight, with water and an intercalant monomer, said intercalant monomer including an alkyl radical having at least 10 carbon atoms in length and having a polar moiety at one end that has a dipole moment greater than the dipole moment of water, to achieve intercalation of said intercalant monomer between said adjacent phyllosilicate platelets in an amount sufficient to space said adjacent phyllosilicate platelets a distance of at least about 5 Å, without an onium ion or silane coupling agent;

combining the intercalate with said matrix polymer;

exfoliating the spaced platelets of said intercalate into predominantly individual platelets; and dispersing said exfoliated platelets throughout said matrix polymer.

35. The method of claim 34, wherein said phyllosilicate is contacted with said water in an intercalating composition including said water, said intercalant monomer, said phyllosilicate, and a liquid polar organic hydrocarbon carrier, and wherein said intercalating composition comprises about 5% to about 50% by weight water, based on the dry weight of said phyllosilicate.

36. The method of claim 35, wherein said intercalating composition comprises about 10% to about 90% by weight of said polar organic liquid hydrocarbon, based on the dry weight of the phyllosilicate.

37. A method of manufacturing a composition comprising an organic liquid and a phyllosilicate intercalate comprising:

contacting the phyllosilicate with an intercalant monomer having an alkyl radical of at least 10 carbon atoms in length and having a polar moiety at one end that has a dipole moment greater than the dipole moment of water, and water, to form an intercalating composition, wherein the weight ratio of the intercalant monomer to phyllosilicate in said intercalating composition is at least about 1 to 20, and the concentration of said intercalant monomer in said intercalating composition is at least about 5% up to about 90% intercalant monomer, based on the dry weight of the phyllosilicate, to form an intercalate having said intercalant monomer intercalated between said adjacent phyllosilicate platelets in an amount sufficient to space said adjacent phyllosilicate platelets a distance of at least about 5 Å, without an onium ion or silane coupling agent; and combining the intercalate with said organic liquid.

38. A composite material comprising a matrix polymer in an amount of about 40% to about 99.95% by weight of the composite material, and about 0.05% to about 60% by weight exfoliated platelets of a phyllosilicate material, said platelets derived from an intercalate formed by contacting a phyllosilicate with an intercalant monomer, said intercalant monomer having an alkyl radical of at least 10 carbon atoms in length and having a polar moiety at one end that has a dipole moment greater than the dipole moment of water, without a coupling agent selected from the group consisting of onium ion and silane coupling agents, to form an intercalating composition, said intercalating composition having a concentration of said intercalant monomer of at least about 2% by weight intercalant monomer, and in a quantity sufficient to incorporate a layer of monomer between adjacent phyllosilicate platelets of sufficient thickness for exfoliation of said platelets, to achieve sorption of the intercalant monomer having alkyl radicals extending perpendicular to the phyllosilicate platelets to expand the spacing between a predominance of the adjacent phyllosilicate platelets at least about 5 Å, when measured after sorption of the intercalant monomer.

39. A composite material in accordance with claim 38, wherein the quantity of intercalant monomer in said intercalating composition is about 16% to about 80% by weight, based on the weight of phyllosilicate contacted by said intercalating composition.

40. A method of manufacturing a composite material containing about 40% to about 99.95% by weight of a matrix thermoplastic or thermosetting polymer, and about 0.05% to about 60% by weight of exfoliated platelets of a phyllosilicate material, said platelets derived from an intercalated phyllosilicate having an intercalant monomer intercalated between adjacent phyllosilicate platelets comprising:

contacting the phyllosilicate with an intercalant monomer having an alkyl radical of at least 10 carbon atoms in length and having a polar moiety at one end that has a dipole moment greater than the dipole moment of water, without first contacting the phyllosilicate with a coupling agent selected from the group consisting of onium ion and silane coupling agents, to form an intercalating composition, said intercalating composition comprising at least about 5% by weight of said intercalant monomer in a quantity sufficient to incorporate a layer of intercalant monomer between adjacent phyllosilicate platelets of sufficient thickness for exfoliation of said platelets, to achieve intercalation of said intercalant monomer between said adjacent phyllosilicate platelets in an amount sufficient to space said adjacent phyllosilicate platelets a distance of at least about 5 Å;

combining the intercalated platelets with said thermoplastic or thermosetting polymer, and heating the polymer sufficiently to provide for flow of said polymer and delamination of the platelets of said phyllosilicate; and dispersing said delaminated platelets throughout said matrix polymer.

41. A method in accordance with claim 40, wherein the intercalating composition includes about 16% to about 80% by weight intercalant monomer, based on the weight of phyllosilicate contacted by said intercalating composition.

42. An intercalate in accordance with claim 1, wherein the amount of intercalant monomer intercalated into the phyllosilicate material is 10–90% monomer based on the dry weight of the phyllosilicate material.

43. An intercalate in accordance with claim 42, wherein the amount of intercalant monomer intercalated into the phyllosilicate material is about 15% to about 80%, based on the dry weight of the phyllosilicate material.

44. An intercalate in accordance with claim 43, wherein the weight ratio of intercalated monomer to phyllosilicate material is from about 16 grams of intercalant monomer per 100 grams of phyllosilicate material to about 80 grams of intercalant monomer per 100 grams of phyllosilicate material.

45. An intercalate in accordance with claim 44, wherein the weight ratio of intercalated monomer to phyllosilicate material is from about 20 grams of intercalant monomer per 100 grams of phyllosilicate material to about 60 grams of intercalant monomer per 100 grams of phyllosilicate material.

46. An intercalate in accordance with claim 1, wherein the weight ratio of intercalant monomer to phyllosilicate material in the intercalating composition is in the range of 1:20 to 1:3.

47. A method in accordance with claim 15, wherein the amount of intercalant monomer intercalated into the phyllosilicate material is 10–90% intercalant monomer, based on the dry weight of the phyllosilicate material.

48. A method in accordance with claim 47, wherein the amount of intercalant monomer intercalated into the phyllosilicate material is about 15% to about 80%, based on the dry weight of the phyllosilicate material.

49. A method in accordance with claim 48, wherein the weight ratio of intercalated monomer to phyllosilicate material is from about 16 grams of intercalant monomer per 100 grams of phyllosilicate material to about 80 grams of intercalant monomer per 100 grams of phyllosilicate material.

50. A method in accordance with claim 49, wherein the weight ratio of intercalated monomer to phyllosilicate material is from about 20 grams of intercalant monomer per 100 grams of phyllosilicate material to about 60 grams of intercalant monomer per 100 grams of phyllosilicate material.

51. A method in accordance with claim 15, wherein the weight ratio of intercalant monomer to phyllosilicate material in the intercalating composition is in the range of 1:20 to 1:3.

52. A composition in accordance with claim 18, wherein the amount of intercalant monomer intercalated into the phyllosilicate material is 10–90% intercalant monomer, based on the dry weight of the phyllosilicate material.

53. A composition in accordance with claim 52, wherein the amount of intercalant monomer intercalated into the phyllosilicate material is 15–80% intercalant monomer, based on the dry weight of the phyllosilicate material.

54. A composition in accordance with claim 53, wherein the weight ratio of intercalated monomer to phyllosilicate material is from about 16 grams of intercalant monomer per 100 grams of phyllosilicate material to about 80 grams of intercalant monomer per 100 grams of phyllosilicate material.

55. A composition in accordance with claim 18, wherein the weight ratio of intercalant monomer to phyllosilicate material in the intercalating composition is in the range of 1:20 to 1:3.

56. A method in accordance with claim 34, wherein the amount of intercalant monomer intercalated into the phyllosilicate material is 10–90% intercalant monomer, based on the dry weight of the phyllosilicate material.

57. A method in accordance with claim 56, wherein the amount of intercalant monomer intercalated into the phyllosilicate material is about 15% to about 80% intercalant monomer, based on the dry weight of the phyllosilicate material.

58. A method in accordance with claim 57, wherein the weight ratio of intercalated monomer to phyllosilicate material is from about 16 grams of intercalant monomer per 100 grams of phyllosilicate material to about 80 grams of intercalant monomer per 100 grams of phyllosilicate material.

59. A method in accordance with claim 58, wherein the weight ratio of intercalated monomer to phyllosilicate material is from about 20 grams of intercalant monomer per 100 grams of phyllosilicate material to about 60 grams of intercalant monomer per 100 grams of phyllosilicate material.

60. A method in accordance with claim 34, wherein the weight ratio of intercalant monomer to phyllosilicate in the intercalating composition is in the range of 1:20 to 1:3.

61. A method in accordance with claim 37, wherein the intercalating composition includes about 16% to about 80% by weight intercalant monomer, based on the weight of phyllosilicate contacted by said intercalating composition.

62. A method in accordance with claim 37, wherein the amount of intercalant monomer intercalated into the phyllosilicate material is 10–90% monomer based on the dry weight of the phyllosilicate material.

63. A method in accordance with claim 62, wherein the amount of intercalant monomer intercalated into the phyllosilicate material is about 15% to about 80%, based on the dry weight of the phyllosilicate material.

64. A method in accordance with claim 63, wherein the weight ratio of intercalated monomer to phyllosilicate material is from about 16 grams of intercalant monomer per 100 grams of phyllosilicate material to about 80 grams of intercalant monomer per 100 grams of phyllosilicate material.

65. A method in accordance with claim 64, wherein the weight ratio of intercalated monomer to phyllosilicate material is from about 20 grams of intercalant monomer per 100 grams of phyllosilicate material to about 60 grams of intercalant monomer per 100 grams of phyllosilicate material.

66. A method in accordance with claim 37, wherein the weight ratio of intercalant monomer to phyllosilicate material in the intercalating composition is in the range of 1:20 to 1:3.

\* \* \* \* \*